US008830218B2

(12) United States Patent
Uchino et al.

(10) Patent No.: US 8,830,218 B2
(45) Date of Patent: Sep. 9, 2014

(54) DISPLAY DEVICE AND ELECTRONIC APPARATUS

(71) Applicant: Sony Corporation, Tokyo (JP)

(72) Inventors: Katsuhide Uchino, Kanagawa (JP); Tetsuro Yamamoto, Kanagawa (JP); Junichi Yamashita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/064,266

(22) Filed: Oct. 28, 2013

(65) Prior Publication Data

US 2014/0049530 A1 Feb. 20, 2014

Related U.S. Application Data

(63) Continuation of application No. 13/064,753, filed on Apr. 13, 2011, now Pat. No. 8,599,178, which is a continuation of application No. 12/071,639, filed on Feb. 25, 2008, now Pat. No. 7,969,394.

(30) Foreign Application Priority Data

Mar. 13, 2007 (JP) ................................ 2007-062776

(51) Int. Cl.

| | |
|---|---|
| ***G06F 3/038*** | (2013.01) |
| ***G09G 5/00*** | (2006.01) |
| ***G09G 3/32*** | (2006.01) |
| ***G09G 3/30*** | (2006.01) |

(52) U.S. Cl.
CPC ................ *G09G 3/30* (2013.01); *G09G 3/3233* (2013.01); *G09G 2300/0861* (2013.01); *G09G 2300/0819* (2013.01)
USPC ................................ 345/210; 345/82; 345/83

(58) Field of Classification Search
USPC ................................ 345/76–83, 92, 204, 210
See application file for complete search history.

(56) References Cited

U.S. PATENT DOCUMENTS

| | | | | |
|---|---|---|---|---|
| 5,684,365 | A | 11/1997 | Tang et al. | |
| 6,496,169 | B1 * | 12/2002 | Mametsuka | 345/87 |
| 6,856,308 | B2 * | 2/2005 | Akimoto et al. | 345/98 |
| 7,612,744 | B2 | 11/2009 | Tateuchi | |
| 7,692,610 | B2 | 4/2010 | Kimura | |
| 2005/0057476 | A1 | 3/2005 | Lin et al. | |
| 2005/0195151 | A1 * | 9/2005 | Ko et al. | 345/100 |
| 2006/0028407 | A1 | 2/2006 | Chou | |
| 2006/0139259 | A1 | 6/2006 | Choi et al. | |
| 2006/0290614 | A1 | 12/2006 | Nathan et al. | |
| 2007/0152921 | A1 | 7/2007 | Osame | |

FOREIGN PATENT DOCUMENTS

JP 08-234683 A 9/1996

* cited by examiner

*Primary Examiner* — Kimnhung Nguyen
(74) *Attorney, Agent, or Firm* — Rader, Fishman & Grauer PLLC

(57) ABSTRACT

A transistor connected to a power source for driving a light-emitting element driving transistor and a transistor setting to a predetermined voltage a source voltage of the light-emitting element driving transistor are commonly controlled by a control signal that takes one of three levels.

20 Claims, 26 Drawing Sheets

DISPLAY DEVICE AND ELECTRONIC APPARATUS

CROSS REFERENCES TO RELATED APPLICATIONS

This is a Continuation Application of U.S. patent application Ser. No. 13/064,753, filed Apr. 13, 2011, which is a Continuation Application of U.S. patent application Ser. No. 12/071,639, filed Feb. 25, 2008, now U.S. Pat. No. 7,969,394, issued on Jun. 28, 2011, which claims priority from Japanese Patent Application JP 2007-062776 filed in the Japanese Patent Office on Mar. 13, 2007, the entire contents of which are incorporated herein by reference.

BACKGROUND OF THE INVENTION

1. Field of the Invention

The present invention relates to display devices and, in particular, a current-driven, self-luminous display device such as an electro-luminescence (EL) element. More particularly, the present invention relates to a self-luminous display device having a smaller number of scanning lines controlling with one of three levels of control signals a transistor for connecting a power source to a light-emitting element driving transistor and a transistor for setting a source voltage of the light-emitting element driving transistor to a predetermined voltage.

2. Description of the Related Art

A variety of techniques have been introduced in display devices employing an organic electroluminescence (EL) element as disclosed in U.S. Pat. No. 5,684,365 and Japanese Unexamined Patent Application Publication No. 8-234683.

FIG. 21 is a block diagram illustrating an active-matrix display device 1 employing an organic EL element of related art. A pixel section 2 in the display device 1 includes a matrix of pixels (PX) 3. Each scanning line (SCN) runs in a substantially horizontal direction along each row of pixels 3 arranged in a matrix configuration, and each signal line SIG runs substantially perpendicular to the scanning lines SCN along each column of the pixels.

As shown in FIG. 22, each pixel 3 includes an organic EL element 8 as a current-driven self-luminous element and a driver circuit for the pixels 3 driving the organic EL elements 8 (hereinafter referred to as a pixel circuit).

In the pixel circuit, one terminal of a signal level maintaining capacitor C1 is maintained at a constant voltage level, and the other terminal of the signal level maintaining capacitor C1 is connected to a signal line SIG via a transistor TR1 that is turned on and off in response to a write signal WS. In the pixel circuit, the transistor TR1 is turned on at a rising edge of the write signal WS, the other terminal of the signal level maintaining capacitor C1 is set to a signal level of the signal line SIG, and the signal level of the signal line SIG is sample-held to the other terminal of the signal level maintaining capacitor C1 at a timing the transistor TR1 is transitioned from an on state to an off state.

In the pixel circuit, the other terminal of the signal level maintaining capacitor C1 is connected to a gate of a P-channel transistor TR2 having a source connected to a power source Vcc. The drain of the transistor TR2 is connected to an anode of the organic EL element 8. The pixel circuit is set so that the transistor TR2 always operates in a saturation state. As a result, the transistor TR2 forms a constant current circuit operating at a drain-source current Ids represented by the following equation (1):

$$Ids=1/2\times\mu\times W/L\times Cox(Vgs-Vth)^2 \quad (1)$$

where Vgs is a gate-source voltage of the transistor TR2 and μ is a mobility, W is a channel width, L is a channel length, Cox is a gate capacitance, and Vth is a threshold voltage of the transistor TR2. In the pixel circuit, the organic EL element 8 is driven by the drive current Ids responsive to the signal level of the signal line SIG sample-held by the signal level maintaining capacitor C1.

The display device 1 generates the write signal WS, as a timing signal for commanding writing to each pixel 3, by successively transferring predetermined sampling pulses with a write-scan circuit (WSCN) 4A in a vertical driver circuit 4. A horizontal selector (HSEL) 5A in a horizontal driver circuit 5 generates a timing signal by successively transferring predetermined sampling pulses and sets each signal line SIG to the signal level of an input signal S1 with respect to the timing signal. The display device 1 sets the terminal voltage of the signal level maintaining capacitor C1 in each pixel section 3 in response to the input signal S1 on a dot-by-dot basis or on a line-by-line basis and then displays an image responsive to the input signal S1.

As shown in FIG. 23, current-voltage characteristics of the organic EL element 8 age with time in a direction that current flowing becomes difficult. In FIG. 23, label L1 represents initial characteristics and label L2 represents aged characteristics. In the pixel circuit of FIG. 22, the P-channel transistor TR2 drives the organic EL element 8. In such a case, the transistor TR2 drives the organic EL element 8 in response to the gate-source voltage Vgs set at the signal level of the signal line SIG. Luminance change in each pixel due to aged current-voltage characteristics is thus prevented.

If the pixel circuit, the horizontal driver circuit 5, and the vertical driver circuit 4 are all constructed of N-channel transistors, these circuits may be fabricated together on an insulating substrate such as a glass substrate in an amorphous silicon process. The display device is thus easily manufactured.

In the comparison of FIG. 24 with FIG. 22, each pixel 13 is fabricated of an N-channel transistor TR2, and a display device 11 is manufactured of pixel sections 12, each including the pixel 13. With the source of the transistor TR2 connected to the organic EL element 8, the gate-source voltage Vgs of the transistor TR2 changes in response to a change in the current-voltage characteristics of FIG. 23. In this case, the current flowing through the organic EL element 8 becomes gradually smaller with time and luminance of each pixel 13 becomes gradually lower. As shown in FIG. 24, emission luminance also varies from pixel to pixel in accordance with variations in the characteristics of the transistor TR2. The variations in the emission luminance disturbs uniformity of a display screen. A user may notice resulting non-uniformity on the display screen.

A circuit arrangement of FIG. 25 has been proposed to control a drop in the emission luminance due to aging of the organic EL element and variations in the emission luminance due to variations in the characteristics of the transistor.

In a display device 21 of FIG. 25, a pixel section 22 includes a matrix of pixels 23. In the pixel 23, one terminal of the signal level maintaining capacitor C1 is connected to an anode of the organic EL element 8 and the other terminal of the signal level maintaining capacitor C1 is connected to the signal line SIG via the transistor TR1 that is turned on and off in response to the write signal WS. In the pixel 23, the voltage of the other terminal of the signal level maintaining capacitor C1 is set to the signal level of the signal line SIG in response to the write signal WS.

In the pixel 23, the two terminals of the signal level maintaining capacitor C1 are respectively connected to the source and the gate of the transistor TR2. The drain of the transistor TR2 is connected to the power source Vcc via the transistor TR3 that is turned on and off in response to a drive pulse signal DS. The organic EL element 8 in the pixel 23 is driven by the transistor TR2. The transistor TR2 forms a source follower with the gate thereof set at the signal level of the signal line SIG. Here, Vcat represents a cathode voltage of the organic EL element 8. The drive pulse signal DS is a timing signal controlling an emission period of each pixel 23. The drive scan circuit (DSCN) 24B generates the drive pulse signal DS by successively transferring predetermined sampling pulses.

The two terminals of the signal level maintaining capacitor C1 are connected to predetermined fixed voltages Vofs and Vss via transistors TR4 and TR5 that are turned on and off in response to control signals AZ1 and AZ2, respectively. The control signal generators 24C and 24D in a vertical driver circuit 24 generate control signals AZ1 and AZ2 as timing signals by successively transferring predetermined sampling pulses.

FIG. 26 is a timing diagram of one pixel 23 in the display device 21. FIG. 26 also shows reference symbols of transistors that are turned on and off in response to corresponding signals. As shown in FIG. 27, during an emission period T1 for causing the organic EL element 8 to emit light, transistors TR1, TR4 and TR5 in the pixel 23 are turned off in response to falling edges of the write signal WS and the control signals AZ1 and AZ2 (waveform diagrams (A)-(C) in FIG. 26). The transistor TR3 is turned on in response to a rising edge of the drive pulse signal DS (waveform diagram (D) of FIG. 26).

The transistor TR2 and the signal level maintaining capacitor C1 in the pixel 23 form a constant current circuit responding to the gate-source voltage Vgs, namely, a voltage difference between the two terminals of the signal level maintaining capacitor C1. The organic EL element 8 emits light in response to the drive current Ids determined by the gate-source voltage Vgs. Luminance drop of the organic EL element 8 due to aging is thus controlled. The drive current Ids is expressed by equation (1) discussed with reference to FIG. 22. In the discussion that follows, each transistor is shown in each figure as a reference symbol of a corresponding switch as appropriate.

The transistors TR4 and TR5 in the pixel 23 remains turned on during a period T2 in succession to the end of an emission period T1, as shown in FIG. 28. The two terminals of the signal level maintaining capacitor C1 in the pixel 23 are set to predetermined fixed voltages Vofs and Vss (waveform diagrams (E) and (F) of FIG. 26). The drive current Ids corresponding to the gate-source voltage Vgs, namely, a voltage difference Vofs−Vss of the predetermined fixed voltages Vofs and Vss flows from the transistor TR2 to the transistor TR5. The fixed voltages Vofs and Vss are set within the period T2 so that the organic EL element 8 may not emit light as a result of an increase of the voltage difference between the two terminals of the organic EL element 8 less than the voltage threshold value Tthe1 of the organic EL element 8 and so that the transistor TR2 operates in the saturation region thereof.

Throughout a predetermined period T3, the transistor TR5 in the pixel 23 remains turned off, as shown in FIG. 29. As represented by a broken line in FIG. 29, the drain-source current Ids of the transistor TR2 in the pixel 23 causes the voltage at the terminal of the signal level maintaining capacitor C1 connected to the transistor TR5 to rise.

FIG. 30 illustrates an equivalent circuit of the organic EL element 8 as a parallel circuit of a diode and a capacitor having a capacitance of Ce1. The drain-source current Ids of the transistor TR2 causes a source voltage Vs of the transistor TR2 to rise gradually during the period T3, as shown in FIG. 31. The source voltage Vs of the transistor TR2 stops rising at the moment the source voltage Vs reaches the threshold voltage Vth of the transistor TR2. In the pixel 23, the voltage difference between the two terminals of the signal level maintaining capacitor C1 is set to a threshold voltage value Vth of the transistor TR2 and the voltage at the terminal of the signal level maintaining capacitor C1 connected to the transistor TR5 is set to a voltage Vofs−Vth resulting from subtracting the threshold voltage value Vth of the transistor TR2 from the fixed voltage Vofs. In this condition, an anode voltage Ve1 of the organic EL element 8 is represented by Ve1=Vofs−Vth. The fixed voltage Vofs is set to result in condition Ve1≤Vcat+Vthe1 in the display device 21 so that the organic EL element 8 may not emit light during the period T3.

The transistors TR3 and TR4 in the pixel 23 are turned off one after another within a period T4, as shown in FIG. 32. With the transistor TR3 turned off prior to turning off the transistor TR4, variations in a gate voltage Vg of the transistor TR2 are controlled. The transistor TR1 in the pixel 23 is then turned off, causing the voltage at the terminal of the signal level maintaining capacitor C1, connected to the transistor TR5, to be a signal level Vsig of the signal line SIG when the voltage at the terminal of the signal level maintaining capacitor C1, connected to the transistor TR5, is at the voltage Vofs−Vth.

In the pixel 23, the source voltage Vs of the transistor TR2 is thus set to a voltage (Vsig+Vth) that is the sum obtained by adding the threshold voltage to the signal level Vsig of the signal line SIG. This arrangement controls variations in the emission luminance due to variations in the threshold voltage Vth of the transistor TR2 as one of the characteristics of the transistor TR2.

The gate-source voltage Vgs of the transistor TR2 is expressed in equation (2):

$$Vgs=Ce1/(Ce1+C1+C2)\times(Vsig-Vofs)+Vth \quad (2)$$

where C2 represents a gate-source capacitance of the transistor TR2. If a parasitic capacitance Ce1 of the organic EL element 8 is larger than each of a capacitance of the signal level maintaining capacitor C1 and a gate-source capacitance C2 of the transistor TR2, the gate-source voltage Vgs of the transistor TR2 is set to a voltage (Vsig+Vth) at a practically acceptable accuracy level.

The transistor TR3 is turned on with the transistor TR1 remaining on within a constant period T5, as shown in FIG. 33. The transistor TR2 in the pixel 23 allows the drain-source current Ids to flow out in response to the gate-source voltage Vgs corresponding to the voltage difference across the two terminals of the signal level maintaining capacitor C1. If the source voltage Vs of the transistor TR2 is lower than the sum of the threshold voltage value Vthe1 and the cathode voltage Vcat of the organic EL element 8 and a current flowing into the organic EL element 8 is small, the source voltage Vs of the transistor TR2 gradually rises from a voltage Vs0 in response to the drain-source current Ids of the transistor TR2, as shown in FIG. 34. The voltage Vs0 is calculated from the following equation (3):

$$Vs0=Vofs-Vth+(C1+C2)/(Ce1+C1+C2)\times(Vsig-Vofs) \quad (3)$$

The rising rate of the source voltage Vs depends on a mobility μ of the transistor TR2. The reference symbols Vs1 and Vs2 represent respectively the source voltages for high and low mobilities μ. The higher the mobility, the higher the rising rate of the source voltage Vs results.

The transistor TR3 in the pixel 23 is turned on with transistor TR1 left on during the constant period T5. Variations in the emission luminance due to variations in the mobility, as one of the characteristics of the transistor TR2, are thus controlled.

With the transistor TR1 turned off, as shown in FIG. 27, the organic EL element 8 is driven by the gate-source voltage Vgs set with the voltage threshold value Vth and the mobility μ corrected. With the transistor TR1 off, the source voltage Vs of the transistor TR2 rises to a voltage level that permits the drain-source current Ids of the transistor TR2 to flow into the organic EL element 8. The organic EL element 8 thus emits light and the gate voltage Vg of the transistor TR2 also rises.

The circuit arrangement of FIG. 25 reduces a drop in the emission luminance of the organic EL element 8 as a result of aging and controls variations in the emission luminance due to variations in the characteristics of the transistor TR2.

For each pixel 23, the circuit arrangement of FIG. 25 includes a single signal line SIG, four scanning lines of the control signals AZ1 and AZ2, the drive pulse signal DS and the write signal WS and four wiring pattern lines of pixel voltages Vcc, Vofs, Vss and Vcat. Even if scanning lines are commonly shared by red color, blue color and green color and the cathode voltage Vcat is arranged separately, four scanning lines are required for a set of a red pixel, a blue pixel and a green pixel.

The display device employing the N-channel transistors has the problem of too many scanning lines. The use of many scanning lines presents difficulty in efficiently arranging pixels at a high density. It becomes difficult to manufacture high-definition display devices at a high yield.

SUMMARY OF THE INVENTION

It is thus desirable to provide a display device having a smaller number of scanning lines.

In accordance with one embodiment of the present invention, a display device includes a pixel circuit of a matrix of pixels and a driver circuit for driving the pixel circuit. Each pixel includes a signal level maintaining capacitor, a first transistor, turned on and off in response to a write signal, for connecting one terminal of the signal level maintaining capacitor to a signal line, a second transistor having a gate thereof connected to the one terminal of the signal level maintaining capacitor connected to the first transistor and a source thereof connected to the other terminal of the signal level maintaining capacitor, a current-driven self-luminous element with a cathode thereof held at a cathode voltage and an anode thereof connected to the source of the second transistor, a third transistor, turned on and off in response to a drive pulse signal, for connecting a drain of the second transistor to a power source voltage, a fourth transistor, turned on and off in response to a control signal, for connecting the terminal of the signal level maintaining capacitor connected to the first transistor to a first fixed voltage and a fifth transistor connected to the other terminal of the signal level maintaining capacitor. The fifth transistor has a gate thereof connected to a second fixed voltage, a drain thereof connected to the other terminal of the signal level maintaining capacitor and a source thereof connected to the drive pulse signal. The driver circuit outputs the write signal, the drive pulse signal and the control signal. The drive pulse signal is output in one of three signal levels of first through third signal levels with the first signal level for turning selectively on the third transistor, the second signal level for turning selectively on the fifth transistor and the third signal level for turning off the third and fifth transistors.

In accordance with the above-described embodiment of the present invention, the third and fifth transistors are controlled to be turned on and off with a single drive pulse. The two different transistors are thus controlled as if being controlled by different control signals. The number of scanning lines for transferring the control signal is thus reduced in comparison with the case in which two transistors are driven by separate control signals.

In accordance with one embodiment of the present invention, a display device includes a pixel circuit of a matrix of pixels and a driver circuit for driving the pixel circuit. Each pixel includes a signal level maintaining capacitor, a first transistor, turned on and off in response to a write signal, for connecting one terminal of the signal level maintaining capacitor to a signal line, a second transistor having a gate thereof connected to the one terminal of the signal level maintaining capacitor connected to the first transistor and a source thereof connected to the other terminal of the signal level maintaining capacitor, a current-driven self-luminous element with a cathode thereof held at a cathode voltage and an anode thereof connected to the source of the second transistor, a third transistor, turned on and off in response to a drive pulse signal, for connecting a drain of the second transistor to a power source voltage and a fourth transistor connected to the other terminal of the signal level maintaining capacitor. The fourth transistor has a gate thereof connected to a first fixed voltage, a drain thereof connected to the other terminal of the signal level maintaining capacitor and a source thereof receiving the drive pulse signal. The driver circuit outputs the write signal and the drive pulse signal. The drive pulse signal is output in one of three signal levels of first through third signal levels with the first signal level for turning selectively on the third transistor, the second signal level for turning selectively on the fourth transistor and the third signal level for turning off the third and fourth transistors. The driver circuit sets the signal level of the signal line to a signal level of a gradation of each pixel connected to the signal line except the period of a second fixed voltage, and during a period throughout which the second fixed voltage is repeatedly applied on the signal line, with the first transistor turned on in response to the write signal, the drive pulse signal is set to the first signal level at the timing the second fixed voltage starts on the signal line, and the drive pulse signal is set to the third signal level at the timing the second fixed voltage ends on the signal line.

The second fixed voltage is set using the signal line, thereby allowing the number of scanning lines to be reduced further.

DESCRIPTION OF THE PREFERRED EMBODIMENTS

The embodiments of the present invention are described below with reference to the drawings.

Figure 1:
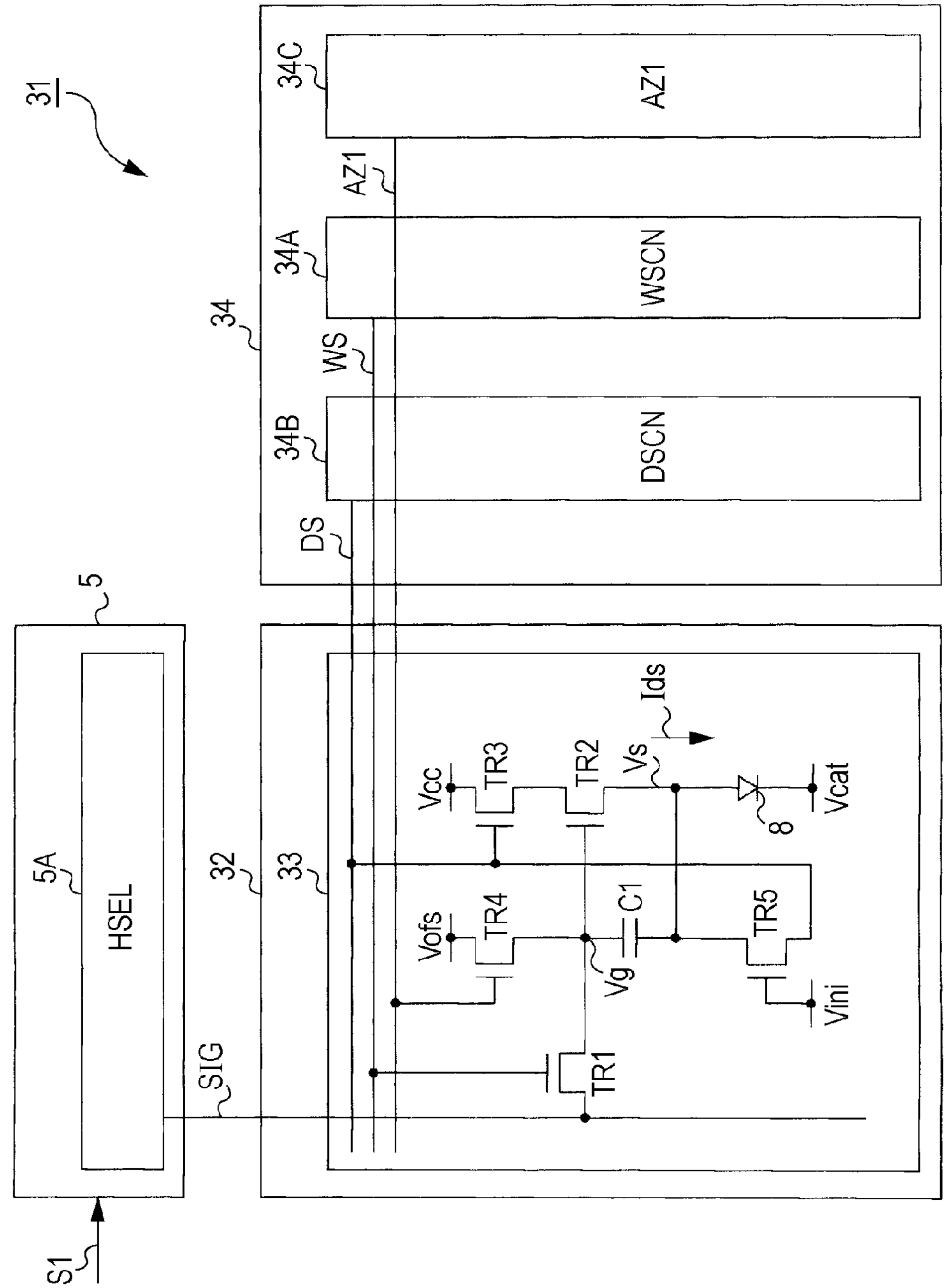
FIG. 1 is a block diagram of a display device in accordance with a first embodiment of the present invention.
Figure 21:
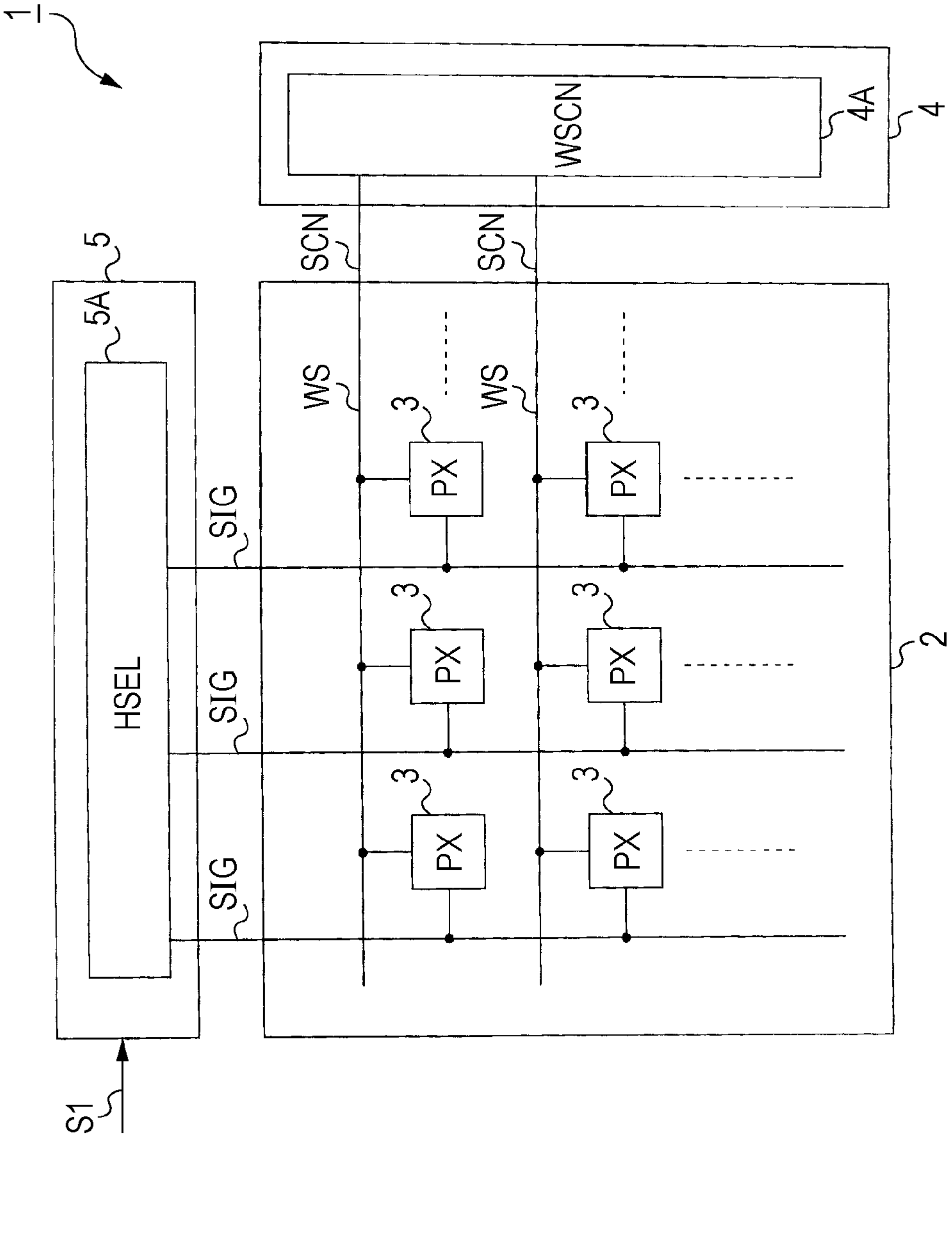
FIG. 21 is a block diagram illustrating a display device of related art.
Figure 22:
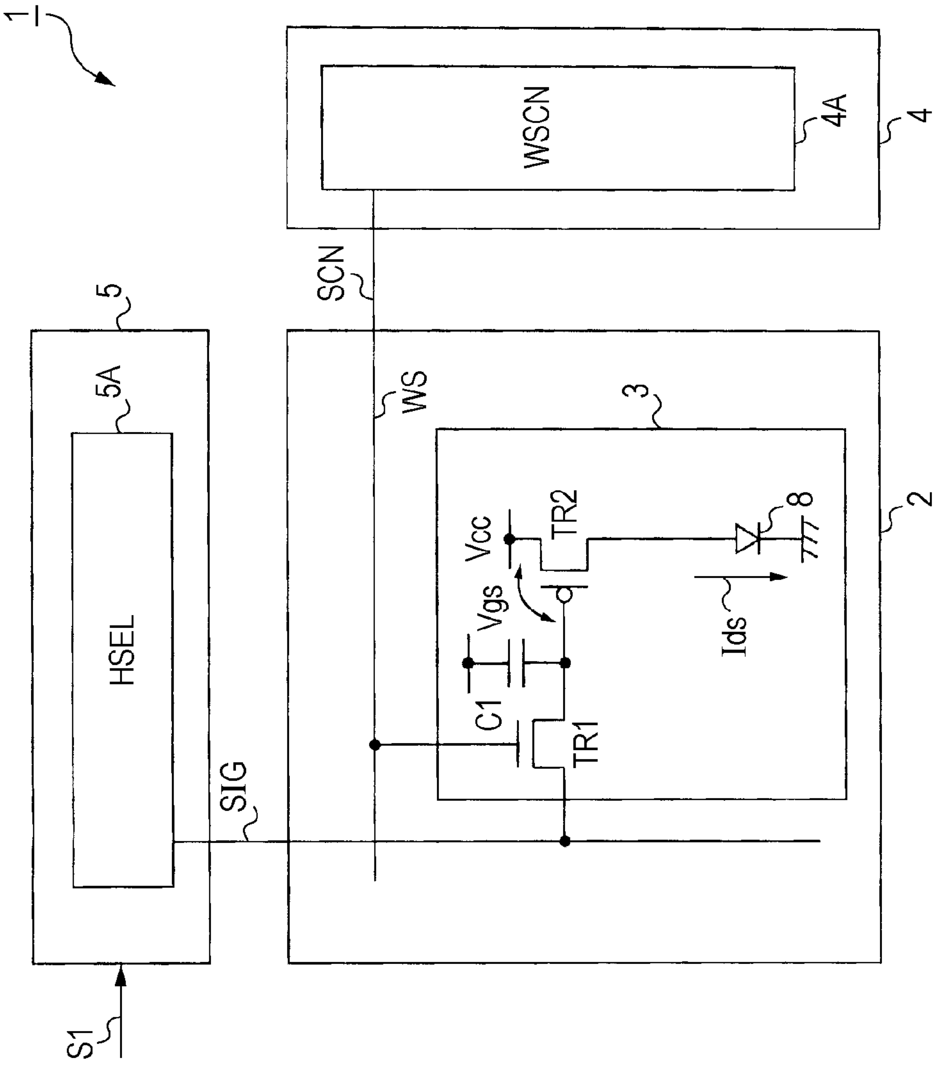
FIG. 22 is a block diagram illustrating in detail the display device of FIG. 21.
Figure 23:
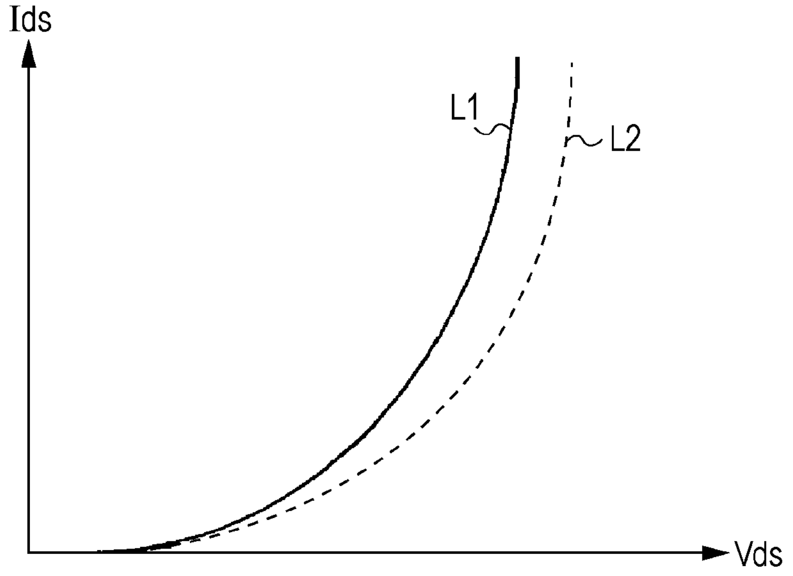
FIG. 23 illustrates a characteristic curve representing an organic EL element aged with time.
Figure 24:
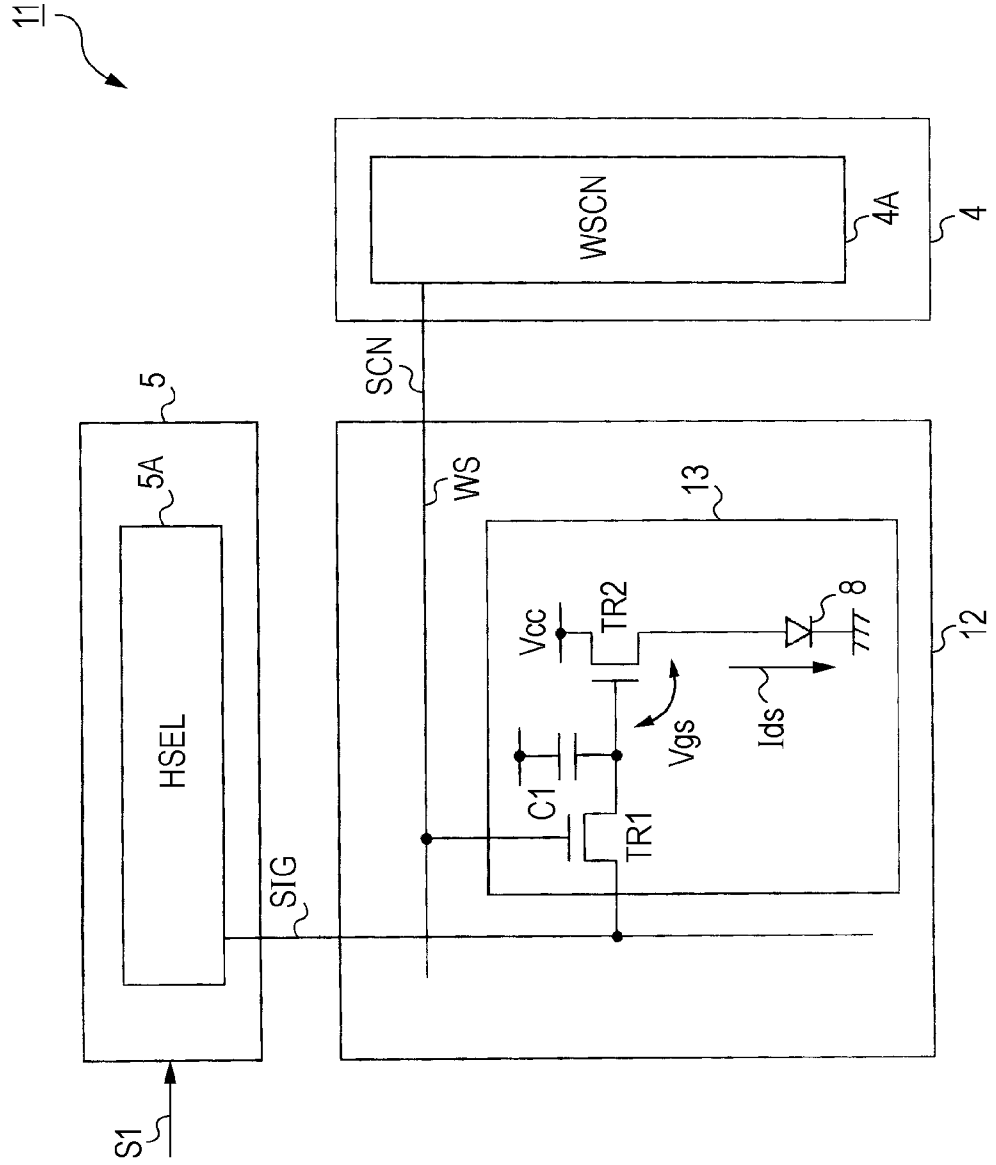
FIG. 24 is a block diagram illustrating the display device of FIG. 22 employing N-channel transistors.
Figure 25:
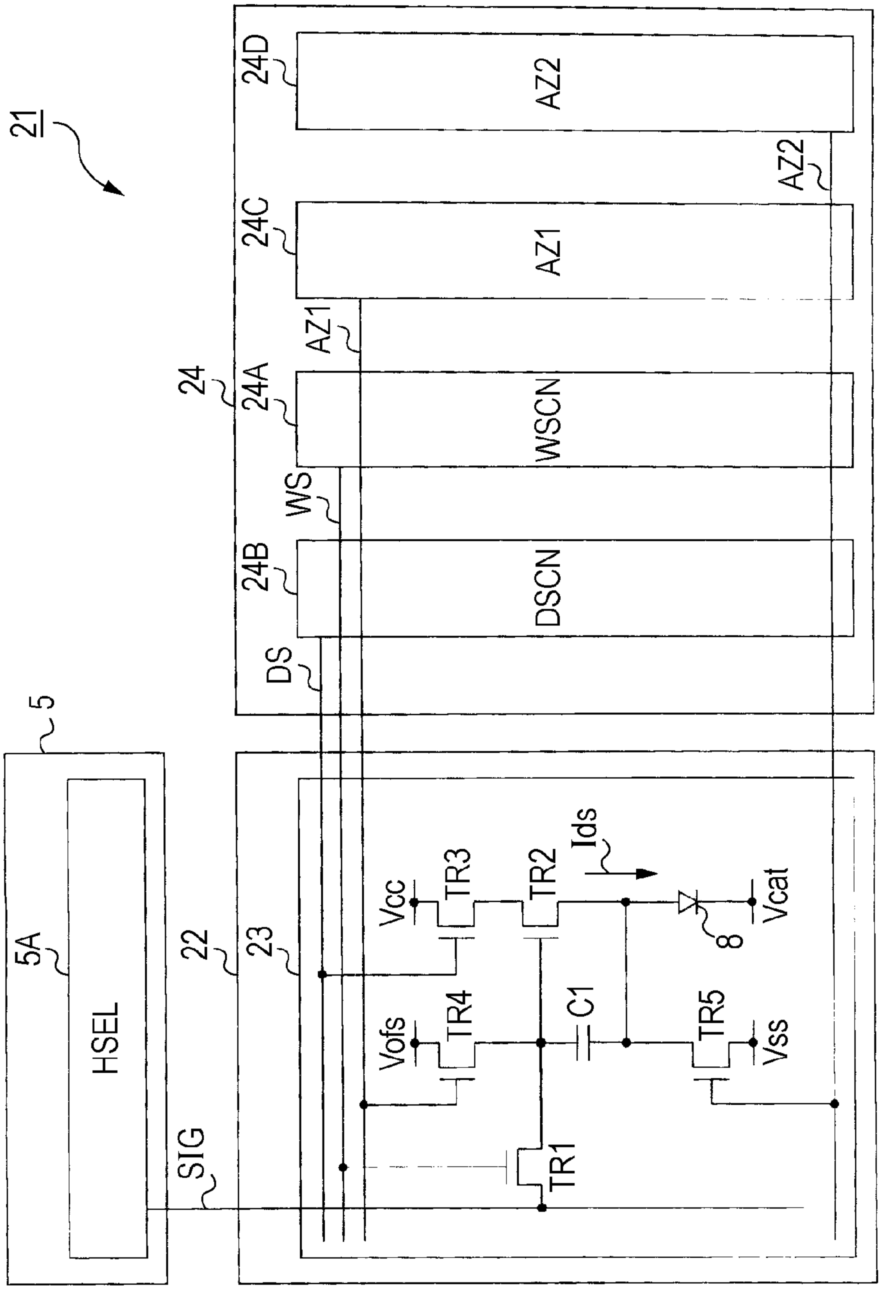
FIG. 25 is a block diagram illustrating a display device of related art employing N-channel transistors.
Figure 26:
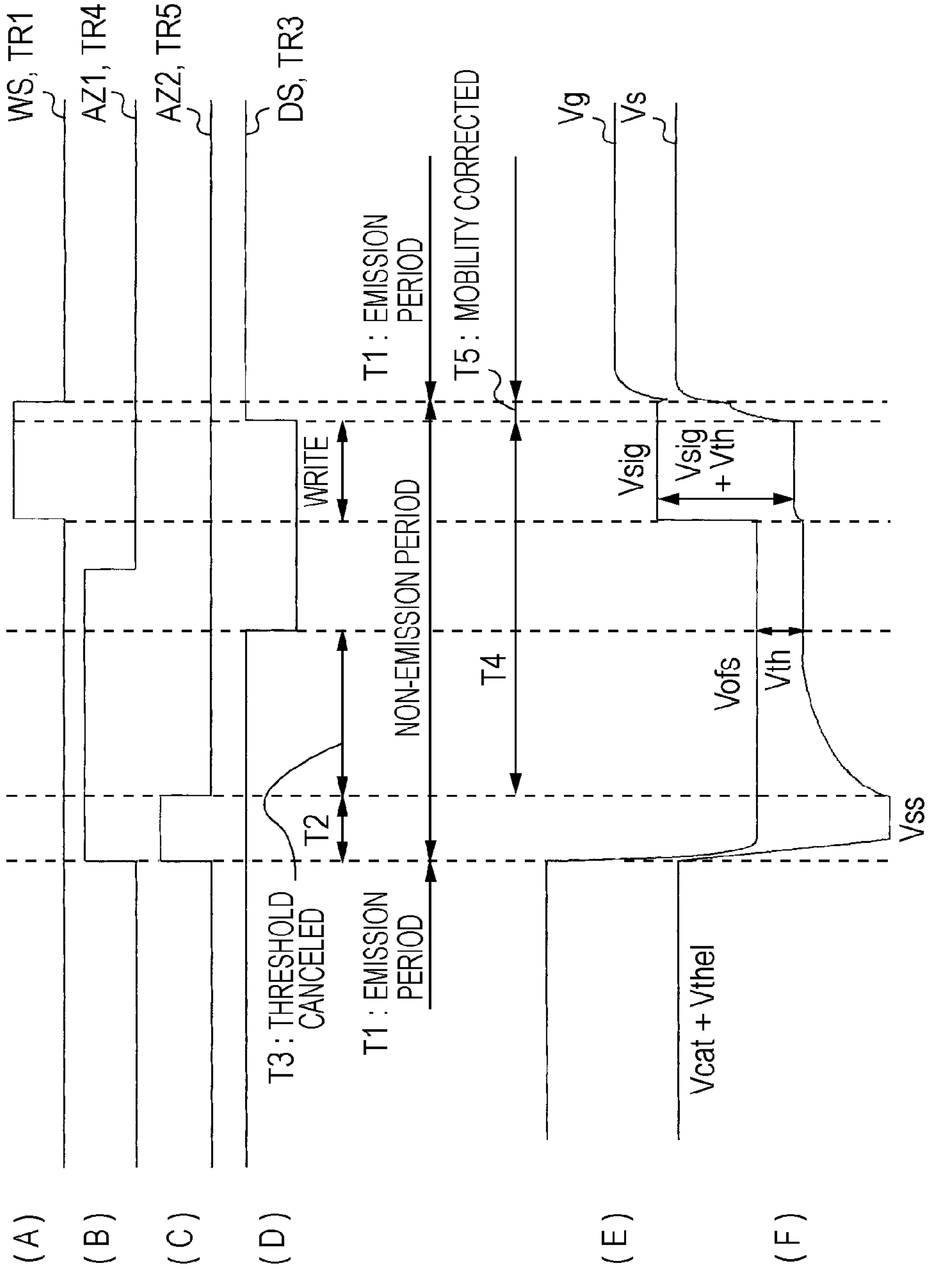
FIG. 26 is a timing diagram of the display device of FIG. 25.
Figure 27:
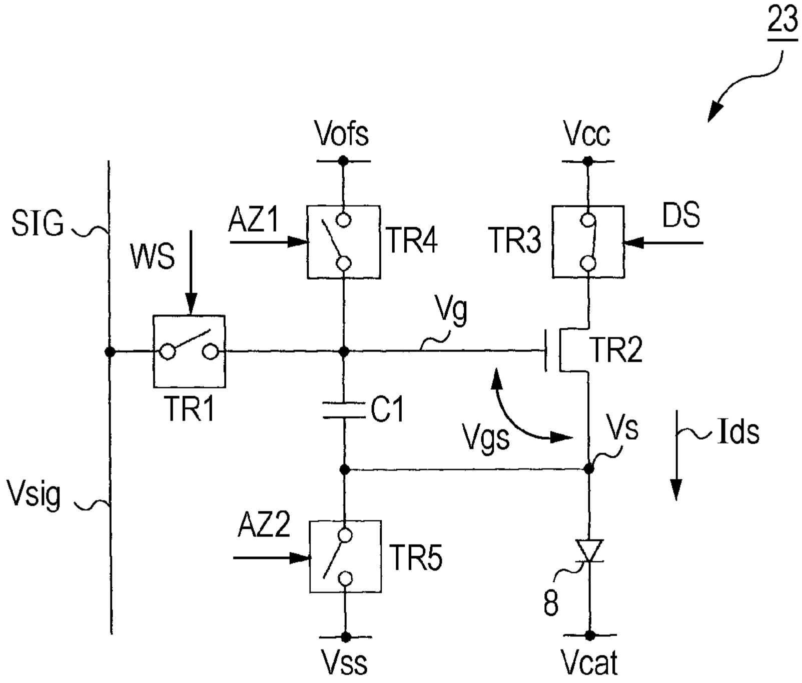
FIG. 27 is a schematic diagram illustrating a setting of the pixel during a period T1 of FIG. 26.
Figure 28:
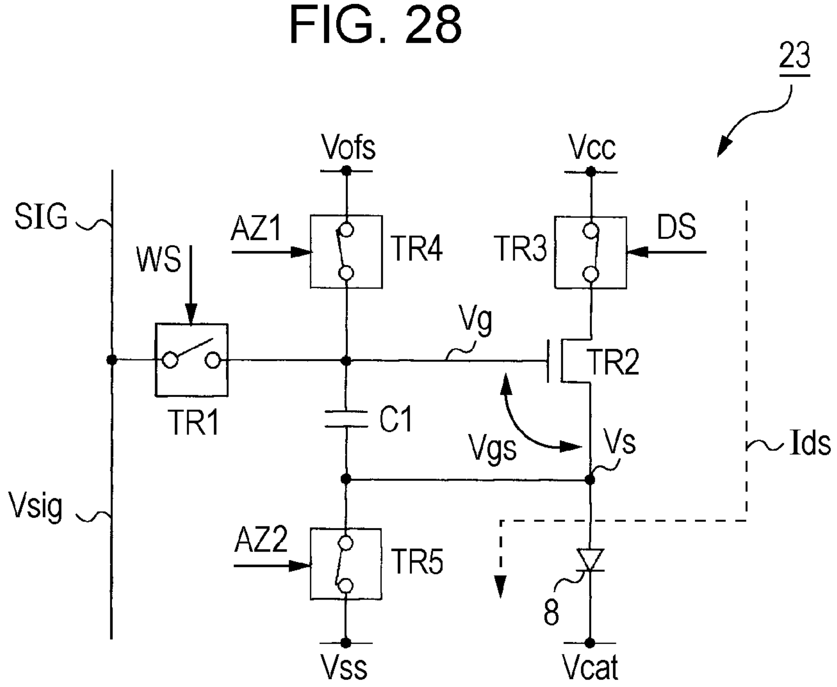
FIG. 28 is a schematic diagram illustrating a setting of the pixel during a period T2 of FIG. 26.
Figure 29:
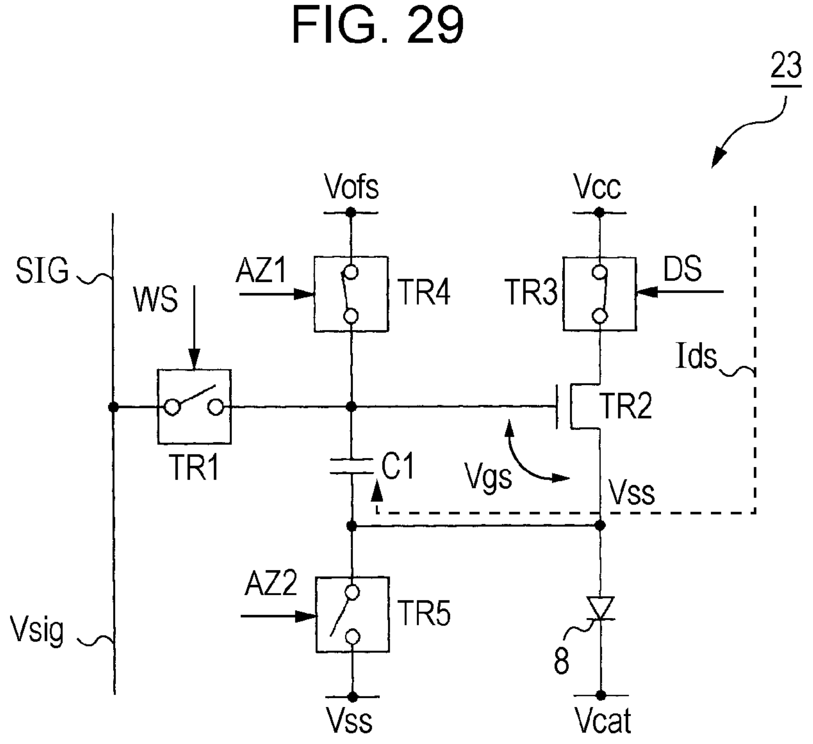
FIG. 29 is a schematic diagram illustrating a setting of the pixel during a period T3 of FIG. 26.
Figure 30:
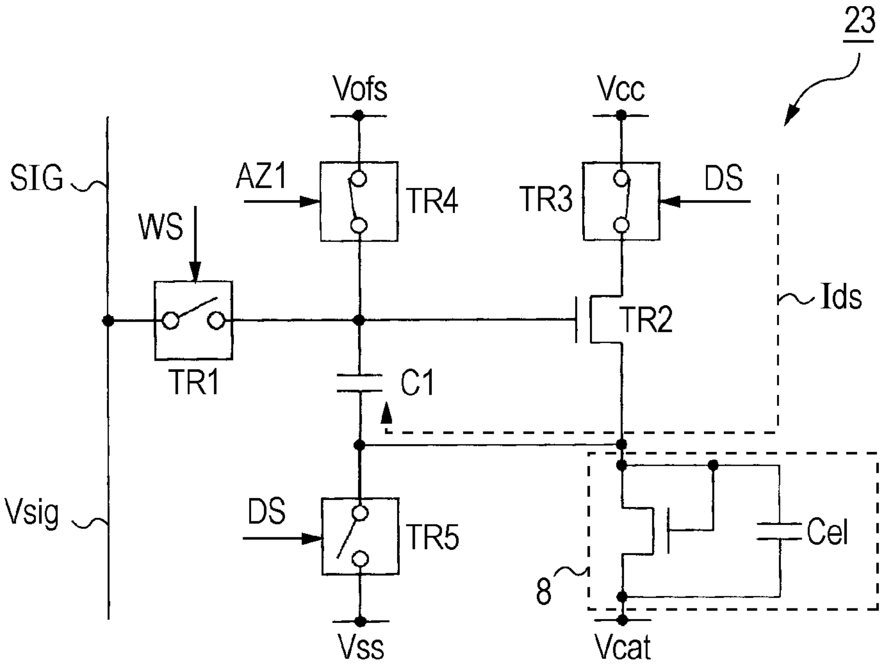
FIG. 30 is a schematic diagram illustrating a setting of the pixel performed in succession to the setting of FIG. 29.
Figure 31:
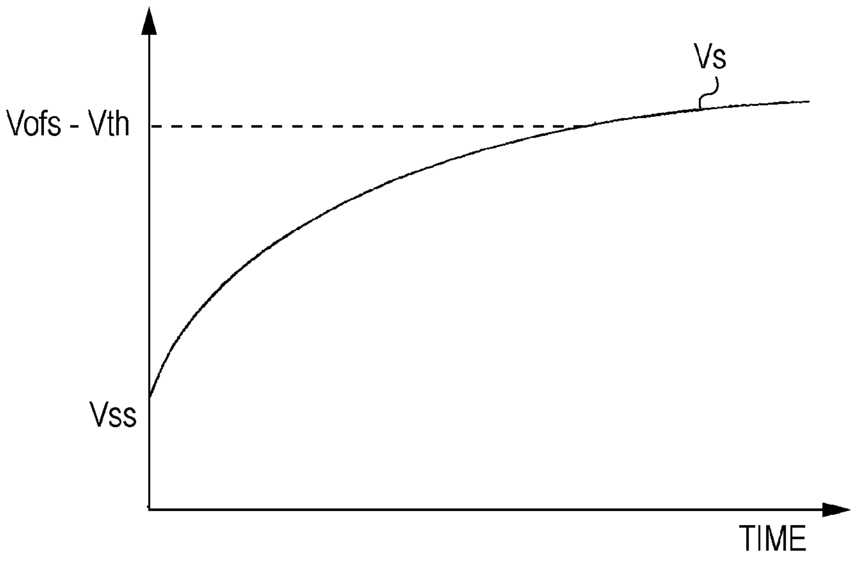
FIG. 31 illustrates a characteristic curve related to correction of a threshold voltage.
Figure 32:
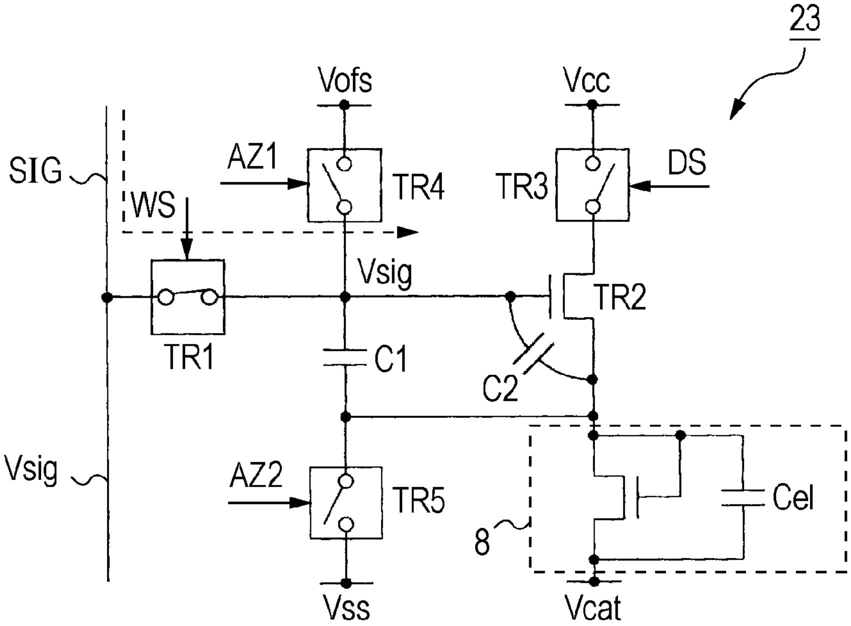
FIG. 32 is a schematic diagram illustrating a setting of the pixel during a period T4 of FIG. 26.

FIG. 1, in comparison with FIG. 25, is a block diagram illustrating a display device 31 in accordance with a first embodiment of the present invention. In FIG. 1, elements described in comparison with the display devices 1, 11 and 21 illustrated with reference to FIGS. 21 and 25 are designated with the same reference numerals and the discussion thereof is omitted herein. The display device 31 is fabricated of N-channel transistors. A pixel section 32, a vertical driver circuit 34, and a horizontal driver circuit 35 in the display device 31 are integrally formed on a glass substrate as an insulating transparent substrate using an amorphous silicon process.

The pixel section 32 includes a matrix of pixels 33. The pixel 33 is structured in the same configuration as the pixel 23 in the display device 21 discussed with reference to FIG. 25 except that the gate of the transistor TR5 is connected to a fixed voltage Vini and that a drive pulse signal DS is connected to the source of the transistor TR5. The transistor TR3 controlling an emission period and the transistor TR5 controlling characteristic variations are controlled by the same control signal. The number of scanning lines is thus set to be three for each pixel 33.

A write scan circuit (WSCN) 34A, a drive scan circuit (DSCN) 34B and a control signal generator circuit (AZ1) 34C in the vertical driver circuit 34 generates the write signal WS, the drive pulse signal DS and the control signal AZ1, respectively. By outputting the drive pulse signal DS in one of three levels, the drive scan circuit (DSCN) 34B causes the transistors TR3 and TR5 to be selectively on or to be concurrently off.

Figure 2:
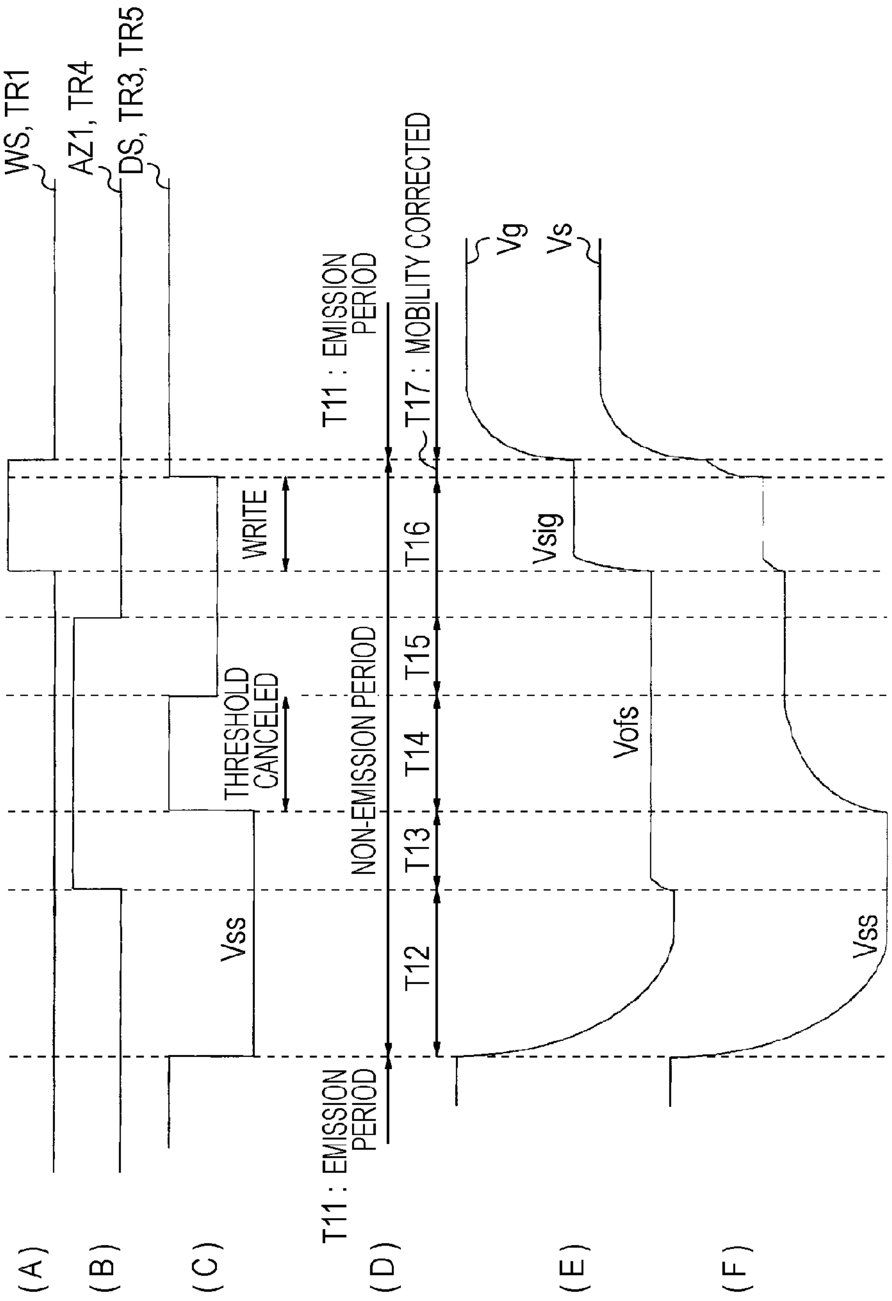
FIG. 2 is a timing diagram of the display device of FIG. 1.
Figure 3:
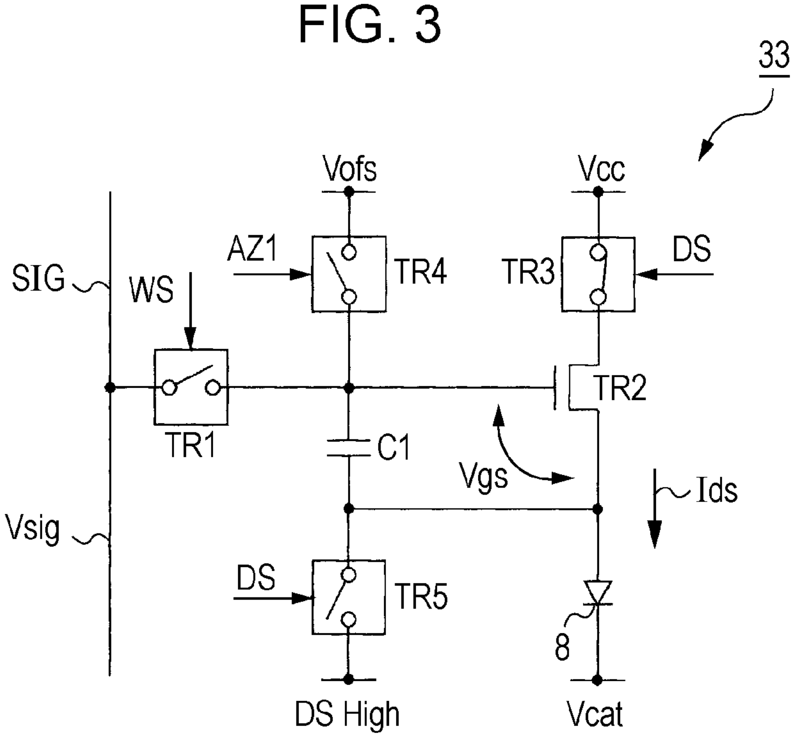
FIG. 3 is a schematic diagram illustrating the setting of a pixel during a period T11 of FIG. 2.

FIG. 2 is a timing diagram illustrating operation of the pixel 33. As shown in FIG. 2, the symbol of each transistor turned on and off by a corresponding signal is also written along with the signal designation. As shown in FIG. 3, the transistors TR1 and TR4 in the pixel 33 are turned off when the write signal WS and the control signal AZ1 are transitioned to the lower voltage levels thereof in the pixel 33 (waveform diagrams (A) and (B) of FIG. 2) during an emission period T11 for the organic EL element 8. The signal level of the drive pulse signal DS (waveform (C) of FIG. 2) is transitioned to a first signal level as the highest level among three voltage levels, thereby causing the transistors TR3 and TR5 to be on and off, respectively. The first signal level of the drive pulse signal DS is set to be equal to or higher than a gate voltage of the transistor TR3 for turning on the transistor TR3. The gate voltage Vini of the transistor TR5 is lower than a gate voltage of the transistor TR3 (i.e., the sum of an off voltage for turning off the transistor TR3 and a threshold voltage of the transistor TR3) and higher than a voltage that is the sum of a voltage Vss and a threshold voltage VthT5 of the transistor TR5 so that the source voltage Vs of the transistor TR2 is maintained at the voltage Vss of the drive pulse signal DS during a subsequent period T12.

A constant current circuit responsive to the gate-source voltage Vgs caused by the voltage difference between the two terminals of the signal level maintaining capacitor C1 is formed of the transistor TR2 and the signal level maintaining capacitor C1 in the pixel 33. A drain-source current Ids determined by the gate-source voltage Vgs causes the organic EL element 8 to emit light. In this way, the display device 31 reduces a drop in the emission luminance of the organic EL element 8. The drain-source current Ids is expressed by equation (1).

Figure 4:
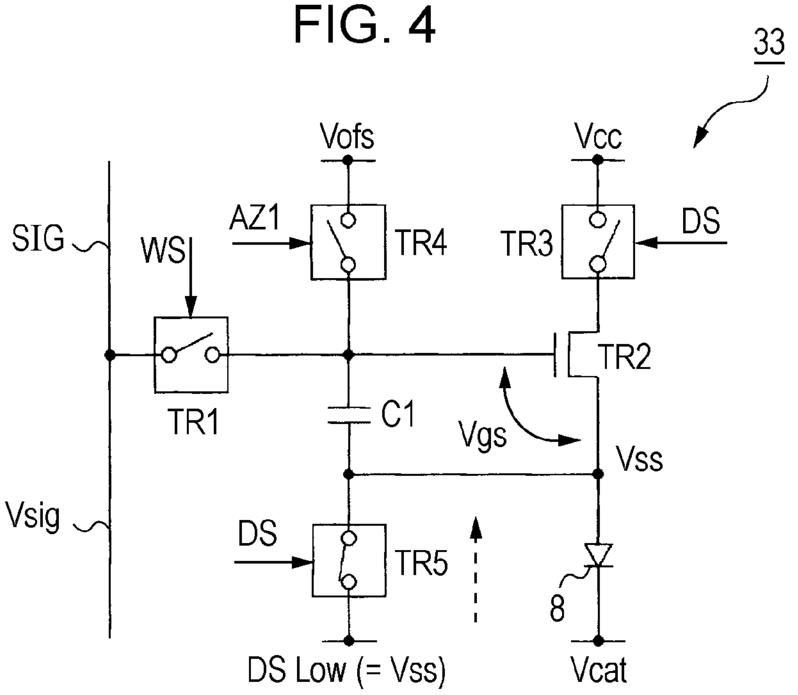
FIG. 4 is a schematic diagram illustrating the setting of a pixel during a period T12 of FIG. 2.

Within the period T12 subsequent to the period T11, the drive pulse signal DS is transitioned to the voltage Vss as a second signal level that is the lowest of the three levels. As shown in FIG. 4, the transistor TR3 is turned off and the transistor TR5 is turned on. With the transistor TR5 on, the source voltage Vs of the transistor TR5 is set to the voltage Vss. More specifically, a relationship of Vini>Vth5+Vss is held between the threshold voltage Vth5 of the transistor TR5 and the gate voltage Vini of the transistor TR5. The voltage Vss is set so that a relationship of Vss≤Vthe1>Vcat is held between a cathode voltage Vcat of the organic EL element 8 and a threshold voltage Vthe1 of the organic EL element 8. During the period T12, the organic EL element 8 stops lighting.

Figure 5:
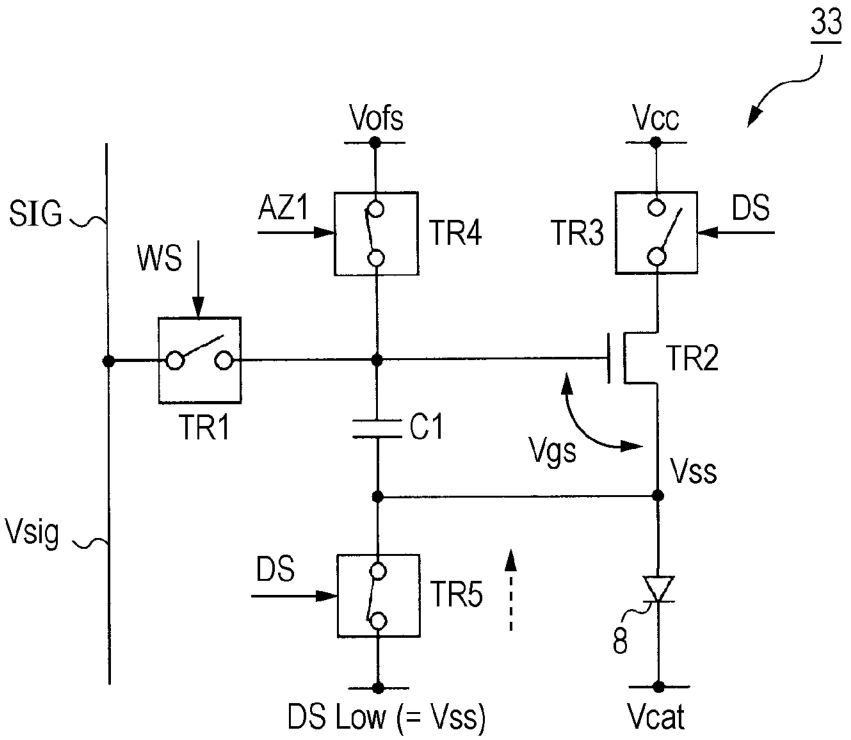
FIG. 5 is a schematic diagram illustrating the setting of a pixel during a period T13 of FIG. 2.

During a period T13, the control signal AZ1 rises, thereby turning on the transistor TR4, as shown in FIG. 5. The terminal of the signal level maintaining capacitor C1 connected to the transistor TR4 is thus set to the fixed voltage Vofs in the pixel 33.

Figure 6:
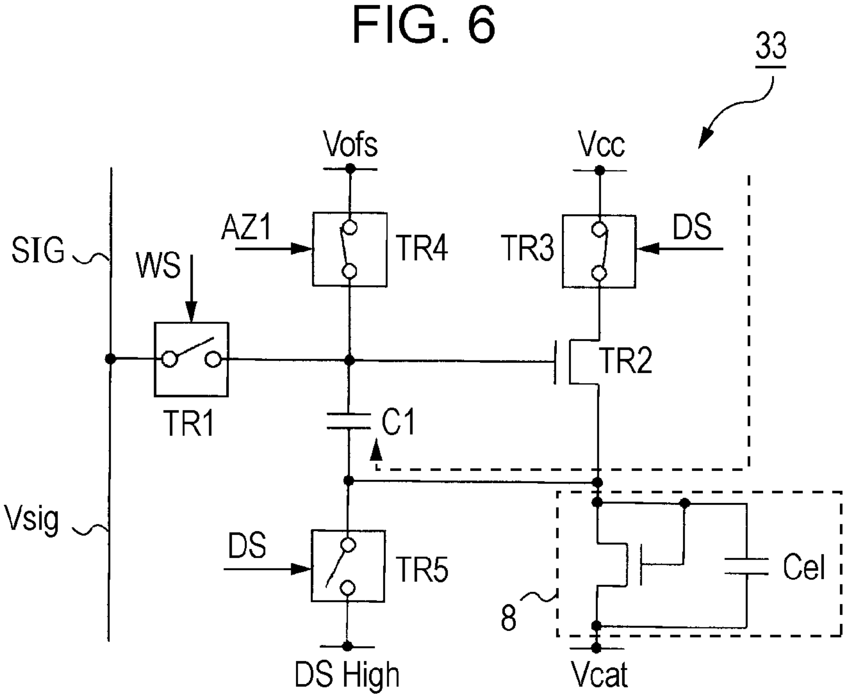
FIG. 6 is a schematic diagram illustrating the setting of a pixel during a period T14 of FIG. 2.
Figure 7:
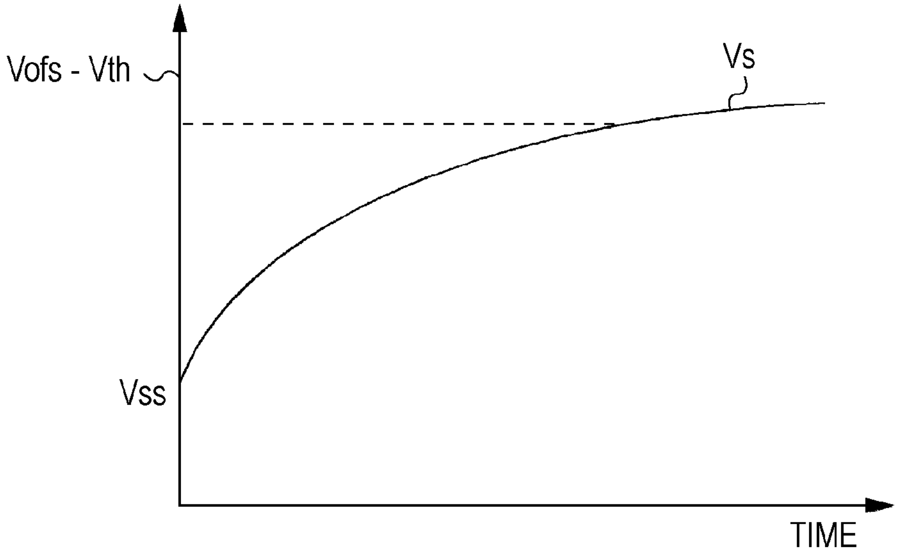
FIG. 7 illustrates a characteristic curve related to correction of a threshold voltage.

Within a subsequent period T14, the drive pulse signal DS is transitioned to the highest voltage level of the three levels. As shown in FIG. 6, the transistor TR3 is turned on and the transistor TR5 is turned off. As shown in FIG. 7, the source voltage Vs of the transistor TR2 rises with the drain-source voltage Ids of the transistor TR2 until the gate-source voltage Vgs of the transistor TR2 reaches the threshold voltage of the transistor TR5. The voltage difference between the two terminals of the signal level maintaining capacitor C1 is set to the threshold voltage Vth of the transistor TR2. At the start of the period T14, the gate-source voltage Vgs of the transistor TR2 is (Vofs−Vss). An anode voltage Ve1 of the organic EL element 8 becomes Ve1=Vofs−Vth. The fixed voltage Vofs is set so that a relationship of Ve1≤Vcat+Vthe1 is held. The source voltage Vs of the transistor TR2 is represented by (Vofs−Vth).

Figure 8:
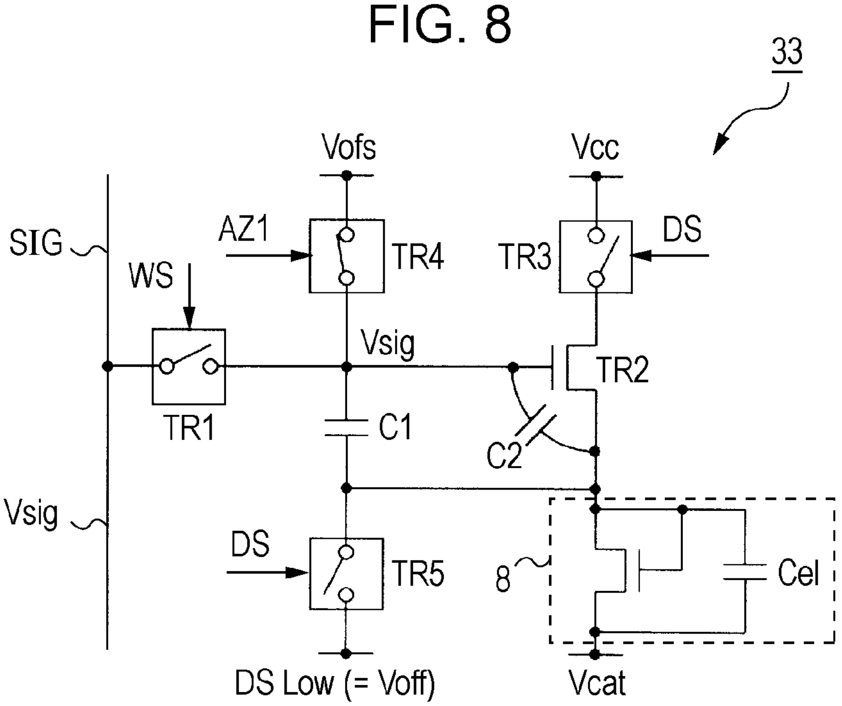
FIG. 8 is a schematic diagram illustrating a setting of the pixel during a period T15 of FIG. 2.

Within a subsequent period T15, the drive pulse signal DS is set to be a signal level Voff as an intermediate value of the three voltage levels. As shown in FIG. 8, the transistors TR3 and TR5 are turned off. The intermediate signal level Voff satisfies a relationship of Vini−Voff<VthT5 where VthT5 is a threshold value of the transistor TR5. Within the period T15, the gate voltage Vg and the source voltage Vs of the transistor TR2 are maintained as the voltages thereof at the end of the period T14.

Figure 9:
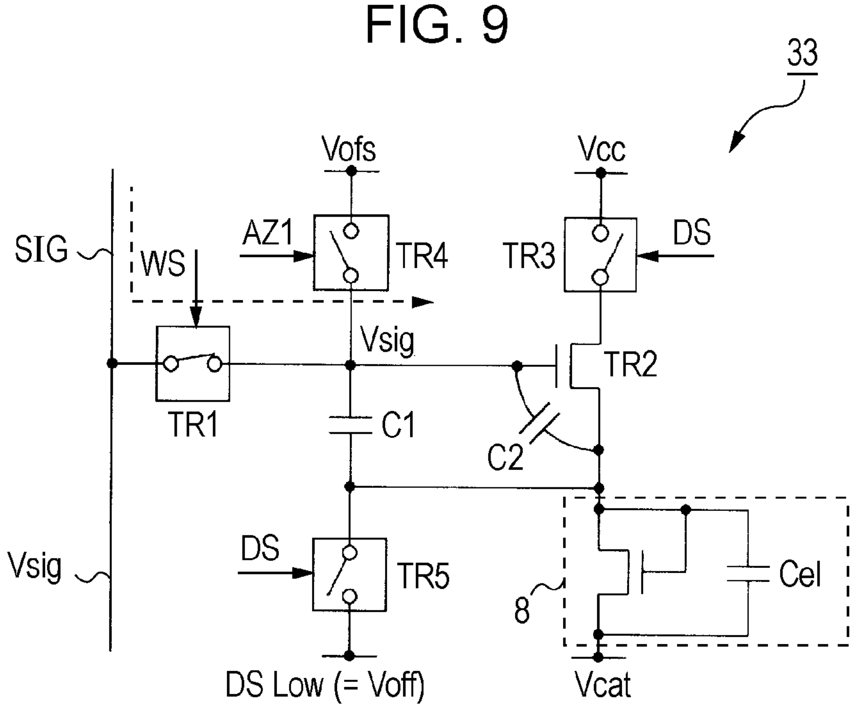
FIG. 9 is a schematic diagram illustrating a setting of the pixel during a period T16 of FIG. 2.

Within a period T16, the control signal AZ1 is transitioned to the low voltage level thereof and the transistor TR4 is turned off, as shown in FIG. 9. The write signal WS is transitioned to the high voltage thereof, thereby causing the transistor TR1 to turn on. With the voltage at the terminal of the signal level maintaining capacitor C1 connected to the transistor TR5 set to the voltage (Vofs−Vth), the terminal voltage at the other terminal of the signal level maintaining capacitor C1 is set to the signal level Vsig of the signal line SIG.

The gate-source voltage Vgs of the transistor TR2 in the pixel 33 is set to the voltage (Vsig+Vth) that is the sum of the signal level Vsig of the signal line SIG and the threshold voltage Vth. This controls variations in the emission luminance due to variations in the threshold voltage Vth of the transistor TR2.

The gate-source voltage Vgs of the transistor TR2 is accurately expressed in equation (2). If the parasitic capacitance Ce1 of the organic EL element 8 is larger than each of the capacitance of the signal level maintaining capacitor C1 and the gate-source capacitance C2 of the transistor TR2, the gate-source voltage Vgs of the transistor TR2 may be set to the voltage (Vsig+Vth) with a practically sufficient accuracy.

Figure 10:
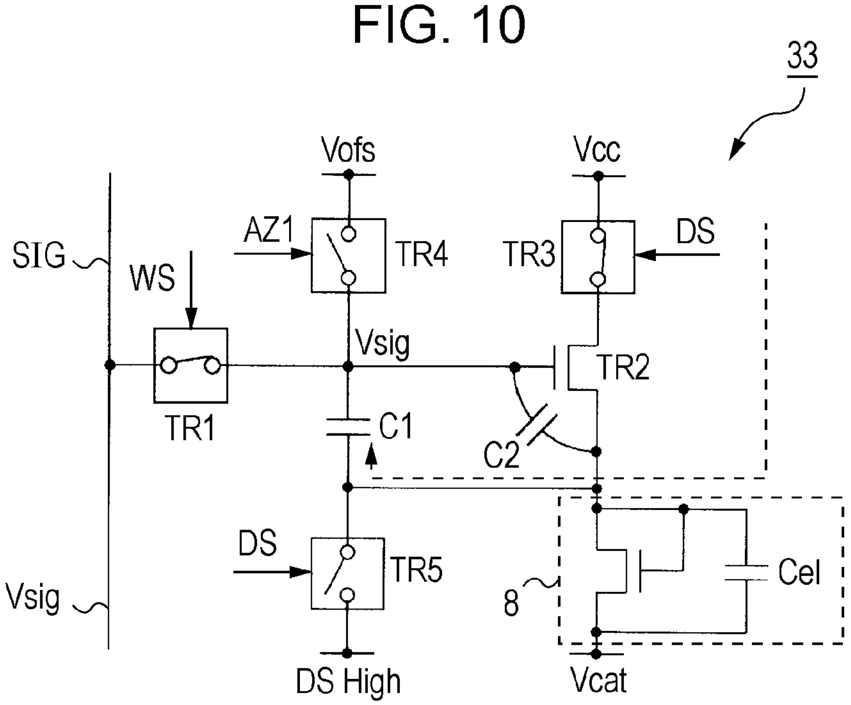
FIG. 10 is a schematic diagram illustrating a setting of the pixel during a period T17 of FIG. 2.
Figure 33:
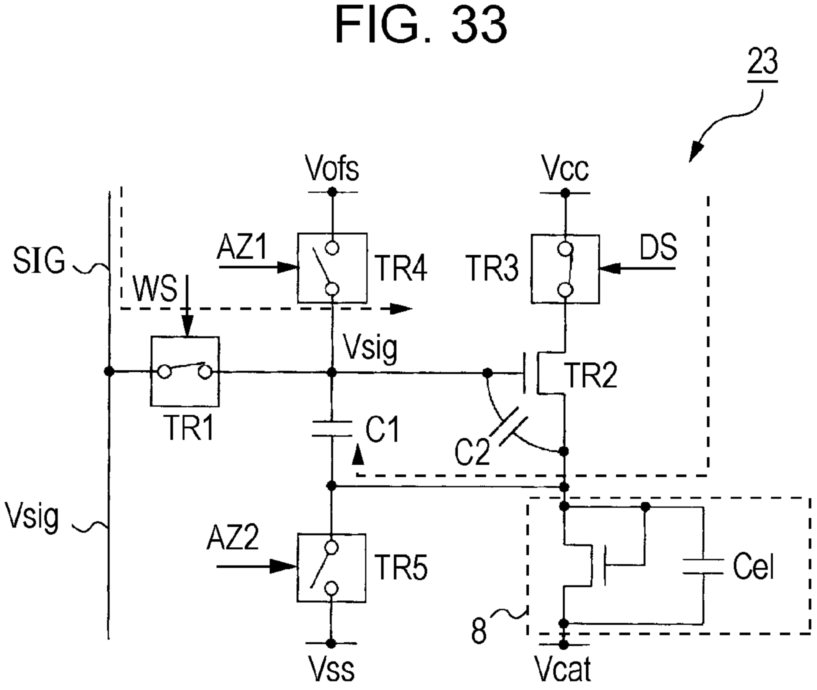
FIG. 33 is a schematic diagram illustrating a setting of the pixel during a period T5 of FIG. 26.

Within a subsequent period T17, the drive pulse signal DS is set to the highest signal level of the three voltage levels in the pixel 33. As shown in FIG. 10, the transistor TR3 is turned on with the transistor TR1 remaining on. The gate-source voltage Vgs as a result of a voltage across the signal level maintaining capacitor C1 allows a drain-source current Ida to flow out from the transistor TR2. If the source voltage Vs of the transistor TR2 is lower than the sum of the threshold voltage Vthe of the organic EL element 8 and the cathode voltage Vcat and if a current flowing into the organic EL element 8 is small, the source voltage Vs of the transistor TR2 gradually rises from the voltage Vs0, as discussed with reference to FIGS. 33 and 34. The rising rate of the source voltage Vs depends on the mobility μ of the transistor TR2. With the transistor TR1 remaining on in the pixel 33, the transistor TR3 is turned on and variations in the mobility of the transistor TR2 are controlled.

As shown in FIG. 3, the transistor TR1 is turned off in the pixel 33 and the organic EL element 8 is driven by the gate-source voltage Vgs set with the threshold voltage Vth and the mobility μ corrected.

In the display device 31 (FIG. 2), the vertical driver circuit 34 drives the scanning lines, thereby setting the signal level of the signal line SIG to the pixels 33 in the pixel section 32 on a line-by-line basis. Each pixel 33 emits light at the signal level set, and a desired image is displayed on the pixel section 32.

More specifically, the transistor TR1 is turned on in the display device 31. The signal level of the signal line SIG is thus set to the signal level maintaining capacitor C1 (within the period T16 of FIG. 2). The transistors TR1, TR4 and TR5 are turned off while the transistor TR3 is turned on. The transistor TR2 thus causes the organic EL element 8 to emit light in response to the voltage set in the signal level maintaining capacitor C1 (during the period T11 of FIG. 2).

In the display device 31, the two terminals of the signal level maintaining capacitor C1 are respectively connected to the gate and the source of the transistor TR2 that drives the organic EL element 8, and the source of the transistor TR2 is connected to the anode of the organic EL element 8. The pixel 33 is thus formed. After the signal level of the signal line SIG is set to the signal level maintaining capacitor C1 in the display device 31, the organic EL element 8 is driven by the gate-source voltage Vgs caused by the voltage difference between the two terminals of the signal level maintaining capacitor C1. Even if all transistors of the display device 31 are N-channel type, a drop in the emission luminance due to aging of the organic EL element 8 is thus reduced.

When the signal level of the signal line SIG is set to the signal level maintaining capacitor C1, the characteristics of the transistor TR2 controlling the organic EL element 8 are corrected by on-off controlling the transistors TR3 through TR5. Variations in the emission luminance due to variations in the characteristics of the transistor TR2 are thus controlled.

Three scanning lines are required to on-off control the transistors TR3 through TR5 (FIG. 25), and the use of a large number of scanning lines presents difficulty in an efficient and high-density arrangement of the pixels 33.

In the display device 31, the transistors TR1 and TR4 are controlled by the write signal WS and the control signal AZ1, respectively, and the transistors TR3 and TR5 are controlled by the drive pulse signal DS.

The gate and the source of the transistor TR5 are respectively connected to the fixed voltage Vini and the drive pulse signal DS. The drive pulse signal DS is output in one of the three signal levels with the first signal level for turning selectively on the transistor TR3, the second signal level for turning selectively on the transistor TR5 and the third signal level for turning off both the transistor TR3 and the transistor TR5.

Even in the arrangement that allows the transistors TR3 and TR5 to be on-off controlled by a common control signal, the transistors TR3 and TR5 can still be selectively controlled in the same manner as when the transistors TR3 and TR5 are on-off controlled by respective control signals thereof. A smaller number of scanning lines thus works.

More specifically, the first signal level of the drive pulse signal DS is set to a voltage that causes the transistor TR3 to turn on in the display device 31. The drive pulse signal DS output at the first signal level allows the transistor TR3 to be selectively turned on. The drive pulse signal DS output at the second signal level is set to the voltage Vss for setting the source voltage Vs of the transistor TR2 to be the second signal level. In this way, the transistor TR5 is selectively turned on. Furthermore, variations in the threshold voltage Vth of the transistor TR2 as one characteristics of the transistor TR2 are controlled. The drive pulse signal DS at the third signal level is set to be higher than a voltage difference between the threshold voltage Vth of the transistor TR2 and the gate voltage Vg of the transistor TR2. Both the transistors TR3 and TR5 are turned off.

The fixed voltage Vini connected to the gate of the transistor TR5 is set to be higher than the sum of the second signal level Vss and the threshold voltage VthT5 of the transistor TR5 and lower than the sum of the gate voltage for turning off the transistor TR3 and the threshold voltage VthT5 of the transistor TR5. The transistors TR3 and TR5 are thus selectively controlled by the single control signal.

When the signal level of the signal line SIG is set to the signal level maintaining capacitor C1, the drive pulse signal DS is set to the voltage Vss at the second signal level to cause the organic EL element 8 to stop lighting. The transistor TR4 is then turned on and the voltage at the terminal of the signal level maintaining capacitor C1 connected to the transistor TR4 is set to the fixed voltage Vofs. The drive pulse signal DS is then set to the first signal level. The voltage across the signal level maintaining capacitor C1 is set to be substantially equal to the threshold voltage Vth of the transistor TR2 driving the organic EL element 8 with reference to the fixed voltage Vofs.

When the threshold voltage Vth of the transistor TR2 is set to the signal level maintaining capacitor C1 in the display device 31, the drive pulse signal DS is set to the third signal level turning off the transistors TR3 and TR5. The transistor TR4 is turned off and the transistor TR1 is turned on. The voltage at the terminal of the signal level maintaining capacitor C1 connected to the transistor TR4 is set to the signal level Vsig of the signal line SIG. The threshold voltage Vth of the transistor TR2 is thus corrected in the display device 31 and the signal level Vsig of the signal line SIG is set to the signal level maintaining capacitor C1. Variations in the emission luminance due to variations in the threshold voltage Vth of the transistor TR2 are thus controlled.

With the transistors TR1, TR4 and TR5 turned off and the transistor TR3 turned on, the organic EL element 8 is driven to light by the voltage set at the signal level maintaining capacitor C1. In this case, the transistor TR1 is turned off after a predetermined period of time has elapsed since the rising of the drive pulse signal DS to the first signal level. The voltage across the signal level maintaining capacitor C1 can be corrected using the mobility of the transistor TR2. Variations in the emission luminance due to variations in the mobility of the transistor TR2 are thus controlled.

With the above-described arrangement, a common control signal taking one of the three signal levels controls the transistor TR3 connecting the transistor TR2 driving the organic EL element 8 to the power source and the transistor TR5 setting the source voltage of the transistor TR2 driving the organic EL element 8 to the predetermined voltage. The number of scanning lines is thus smaller than in the related art.

The second signal level of the three voltage levels is set to the voltage Vss for maintaining the source voltage of the transistor TR2 to the second signal level and the third signal level is set to be higher than the difference voltage that is obtained by subtracting the threshold voltage Vth of the transistor TR2 from the gate voltage of the transistor TR2. The transistors TR3 and TR5 are selectively or concurrently turned off. The organic EL element 8 is caused to emit light with variations in a variety of characteristics corrected.

The fixed voltage Vini of the transistor TR5 is set to be higher than the sum of the second signal level and the threshold voltage VthT5 of the transistor TR5 of the transistor TR5 and lower than the sum of the gate voltage of the transistor TR3 and the threshold voltage VthT5 of the transistor TR5. The transistors TR3 and TR5 are reliably controlled by the single control signal.

The signal level Vsig of the signal line SIG is set after the threshold voltage Vth of the transistor TR2 is set to the signal level maintaining capacitor C1. Variations in the emission luminance due to variations in the threshold voltage Vth of the transistor TR2 are thus controlled.

The transistor TR1 is turned off after a predetermined period of time has elapsed since the rising of the drive pulse signal DS to the first signal level. Variations in the emission luminance due to variations in the mobility of the transistor TR2 are thus controlled.

If the pixel circuit and the driver circuit are all constructed of N-channel transistors, these circuits may be fabricated together on an insulating substrate such as a glass substrate in an amorphous silicon process. The display device is thus easily manufactured.

Figure 11:
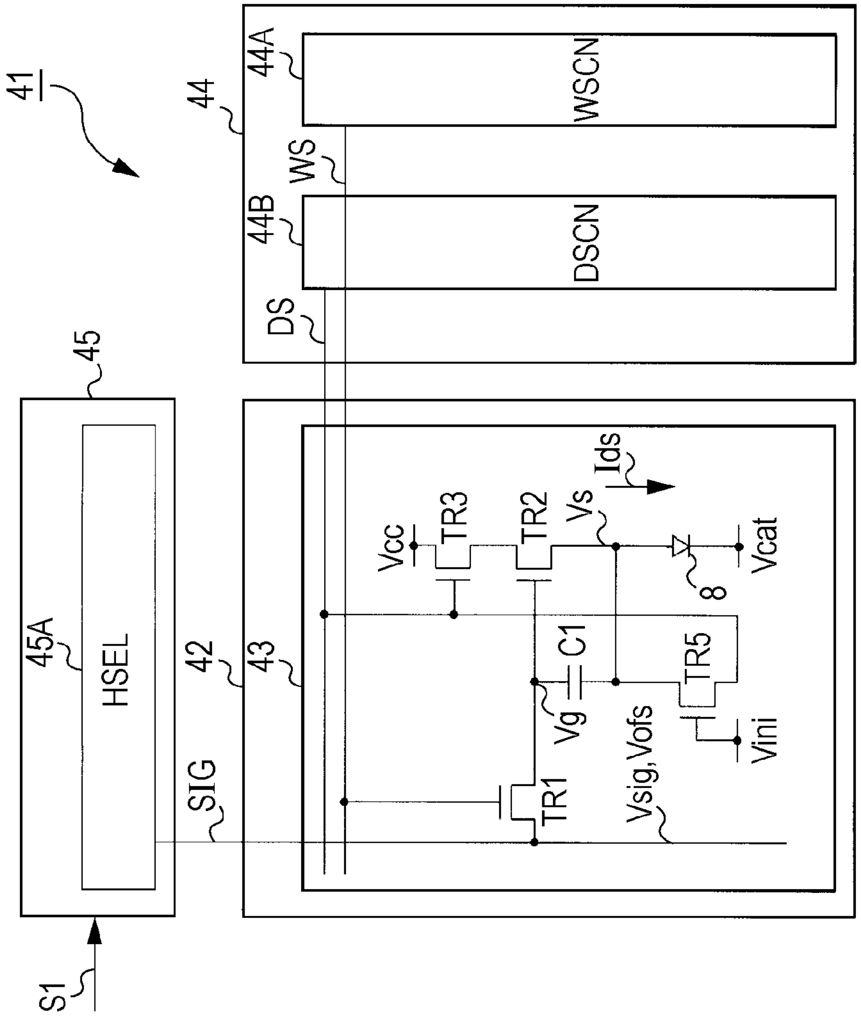
FIG. 11 is a block diagram illustrating a display device in accordance with a second embodiment of the present invention.

FIG. 11 is a block diagram illustrating a display device 41 in accordance with a second embodiment of the present invention. Elements in the display device 41 identical to those in the display device 31 of FIG. 1 are designated with the same reference numerals and the discussion thereof is omitted. All transistors employed in the display device 41 are N-channel type transistors. A pixel section 42, a horizontal driver circuit 45, and a vertical driver circuit 44 are integrally formed on a glass substrate as a transparent insulating substrate using an amorphous silicon process.

Figure 12:
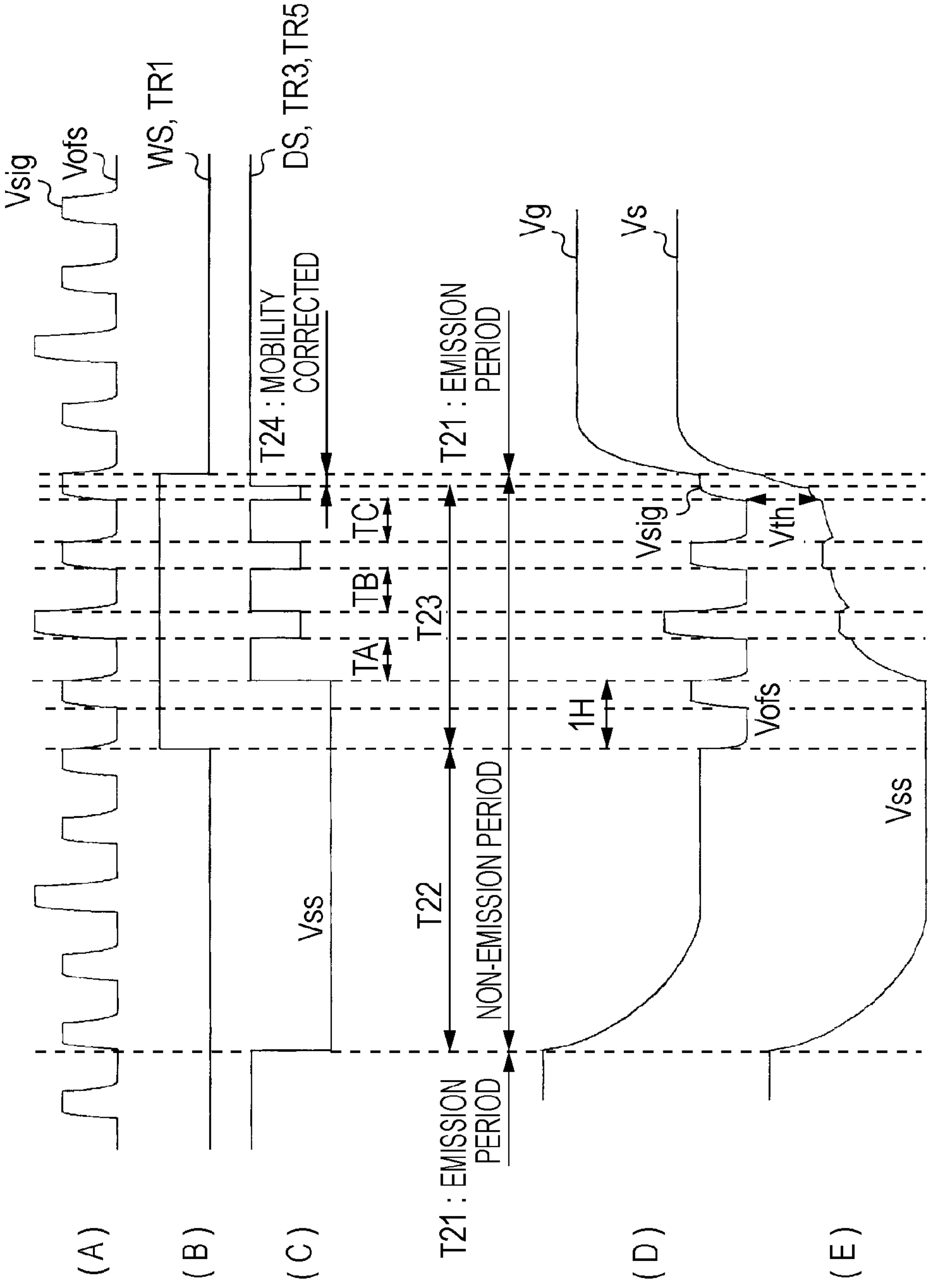
FIG. 12 is a timing diagram of the display device of FIG. 11.

A horizontal selector (HSEL) 45A in the horizontal driver circuit 45 generates a timing signal by transferring successively predetermined sampling pulses and sets each signal line SIG to a signal level of an input signal S1 with respect to the timing signal. As shown in FIG. 12, provided in comparison with FIG. 1, the signal level of the signal line SIG is set to a predetermined fixed voltage Vofs discussed with reference to the first embodiment for about the first half of one horizontal scanning period (1H) and then set to a signal level Vsig responsive to a gradation of a pixel 44 corresponding to the signal level of the signal line SIG for a subsequent second half of the one horizontal scanning period (waveform diagram (A) of FIG. 12).

The vertical driver circuit 44, as opposed to the horizontal driver circuit 55, does not include the control signal generator circuit (AZ1) outputting the control signal controlling the fixed voltage Vofs. A write scan circuit (WSCN) 44A and a drive scan circuit (DSCN) 44B in the vertical driver circuit 44 generate a write signal WS and a drive pulse signal DS, respectively.

The pixel section 42 includes a matrix of pixels 43. Each pixel 43 includes transistors TR1 through TR3 and TR5, the signal level maintaining capacitor C1 and the organic EL element 8. The pixel section 42 does not include the transistor TR4 for on-off controlling the fixed voltage Vofs.

Figure 13:
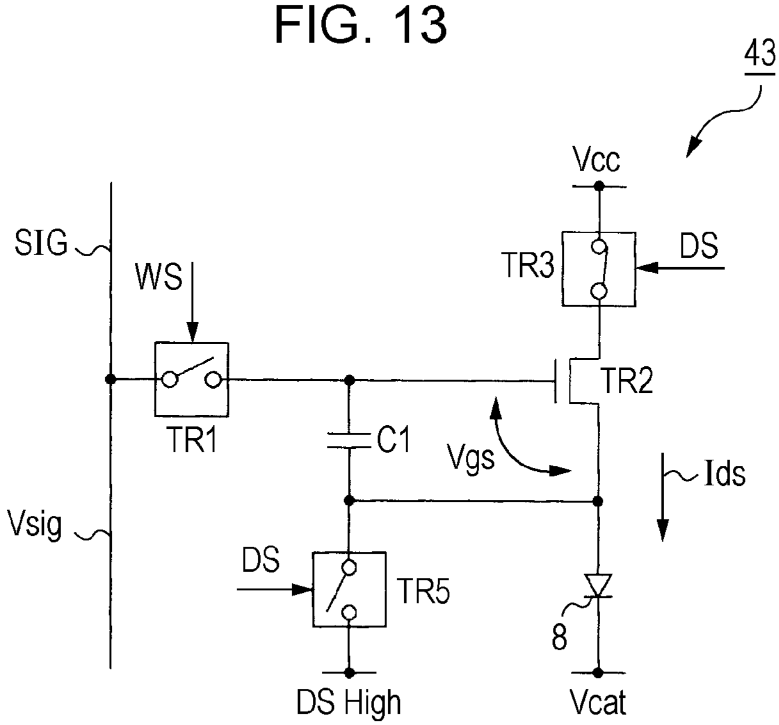
FIG. 13 is a schematic diagram illustrating a setting of the pixel during a period T21 of FIG. 12.

As shown in FIG. 13, the write signal WS is transitioned to the low voltage level thereof in the pixel 43 within an emission period T21 for causing the organic EL element 8 to light (waveform diagram (B) of FIG. 2) and the transistor TR1 is thus turned off. When the drive pulse signal DS is transitioned to the low voltage level thereof (waveform diagram (C) of FIG. 2) and the transistors TR3 and TR5 are turned on and off, respectively. The transistor TR2 and the signal level maintaining capacitor C1 in the pixel 23 form a constant current circuit responding to the gate-source voltage Vgs, namely, a voltage difference between the two terminals of the signal level maintaining capacitor C1. The organic EL element 8 emits light in response to the drive current Ids determined by the gate-source voltage Vgs.

Figure 14:
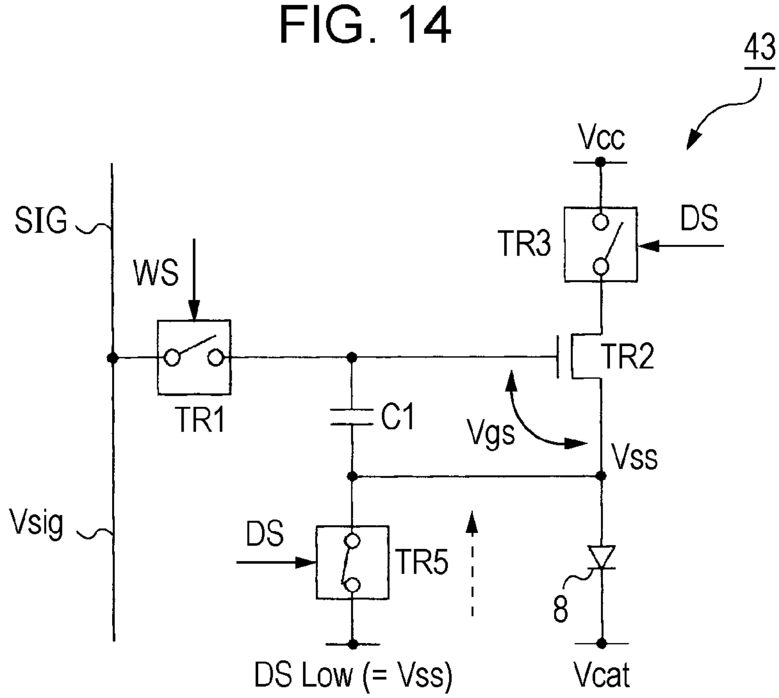
FIG. 14 is a schematic diagram illustrating a setting of the pixel during a period T22 of FIG. 12.

Within a constant period T22 subsequent to the period T21 in the pixel 43, the drive pulse signal DS is transitioned to the second signal level Vss. As shown in FIG. 14, the transistors TR3 and TR5 are turned off and on, respectively. The organic EL element 8 stops lighting. The source voltage Vs of the transistor TR2 is set to the voltage Vss at the second signal level.

Figure 15:
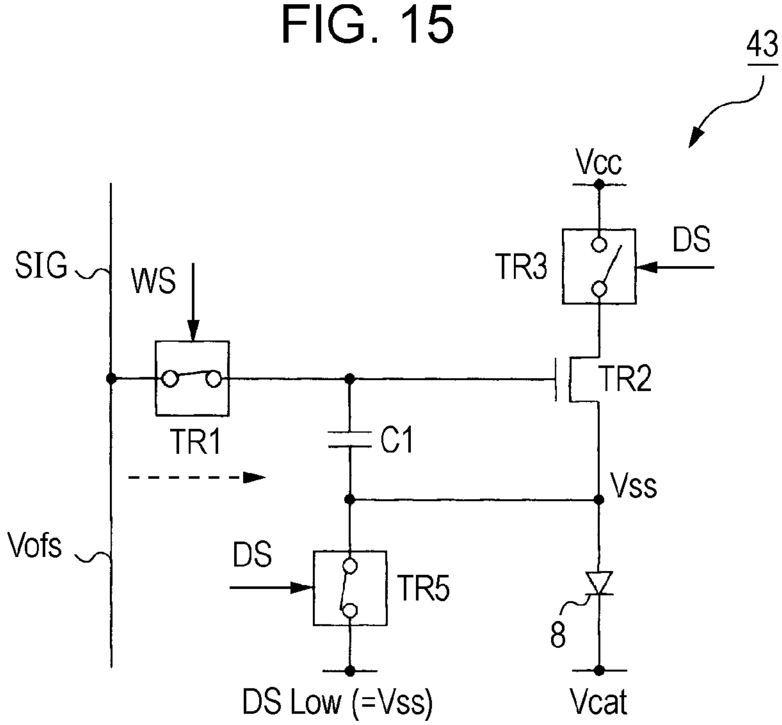
FIG. 15 is a schematic diagram illustrating a setting of the pixel during a period T23 of FIG. 12.

Within a subsequent period T23, the write signal WS is transitioned to the high voltage level thereof during a period throughout which the signal level of the signal line SIG is set to the fixed voltage Vofs. As shown in FIG. 15, the transistor TR1 is turned on. The voltage at the terminal of the signal level maintaining capacitor C1 connected to the transistor TR2 is set to the fixed voltage Vofs in the pixel 43.

Figure 16:
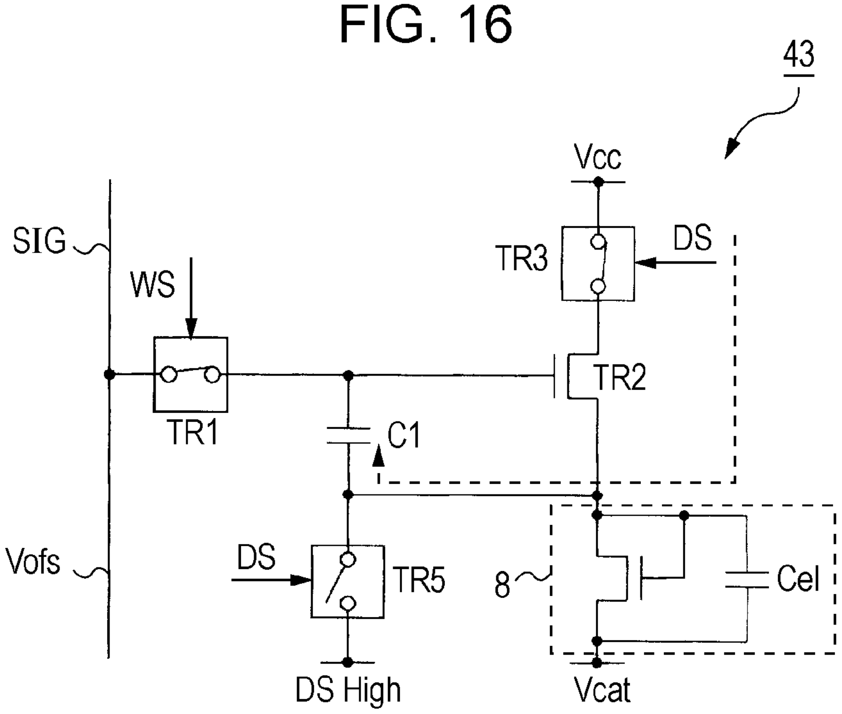
FIG. 16 is a schematic diagram illustrating a setting of the pixel performed in succession to the setting of FIG. 15.

The drive pulse signal DS is transitioned to the first signal level with the signal level of the signal line SIG set to the fixed voltage Vofs at a time point of a predetermined number of horizontal scanning periods before the start of the emission period T21. As shown in FIG. 16, the transistor TR3 is turned on and the transistor TR5 is turned off. In the same manner as previously discussed with reference to FIG. 6, with the drive pulse signal DS at the first signal level, the source voltage Vs of the transistor TR2 gradually rises in the direction that the voltage across the signal level maintaining capacitor C1 becomes the threshold voltage Vth of the transistor TR2 in the pixel 43.

In the condition of FIG. 16, the relationship of Ve1≤Vca+Vthe1 is held in the pixel 43. The drain-source voltage Ids of the transistor TR2 is used to charge the signal level maintaining capacitor C1 and the organic EL element 8. The organic EL element 8 remains on standby, stopping lighting.

Figure 17:
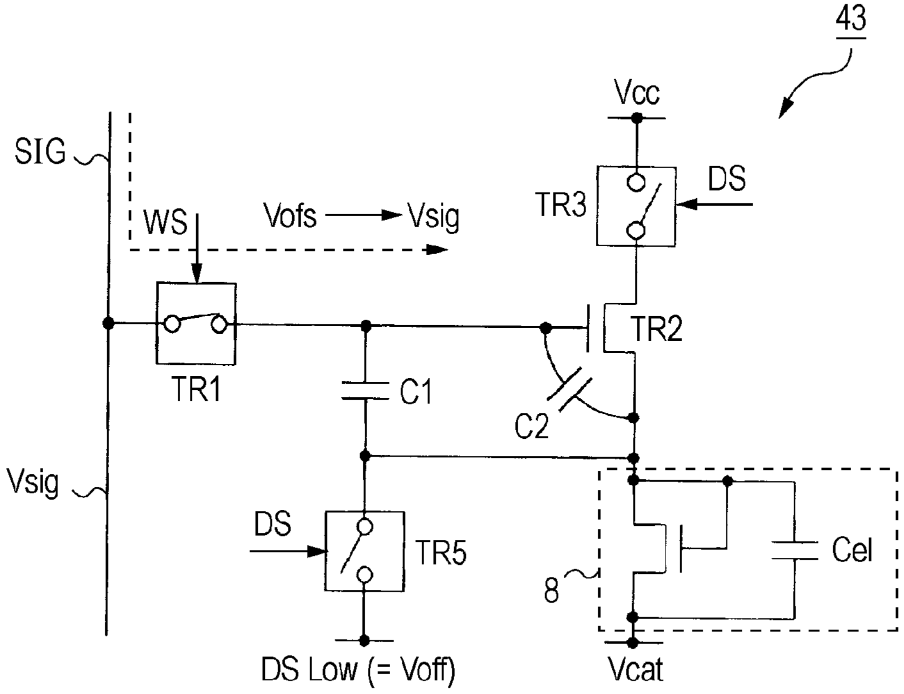
FIG. 17 is a schematic diagram illustrating a setting of the pixel performed in succession to the setting of FIG. 16.

The drive pulse signal DS is set to the third signal level at the time the signal level of the signal line SIG rises to the signal level Vsig corresponding to the gradation of the pixel. As shown in FIG. 17, the transistors TR3 and TR5 are turned off. The change in the source voltage Vs of the transistor TR2 is expressed by equation (4):

$$\Delta Vs=(C1+C2)/(Ce1+C1+C2)\times(Vsig-Vofs) \tag{4}$$

After a predetermined period of time, the signal level of the signal line SIG is set to be the fixed voltage Vofs and input to the gate of the transistor TR2. A change in the source voltage Vs of the transistor TR2 is expressed by the following equation (5):

$$\Delta Vs=Ce1/(Ce1+C1+C2)\times(Vofs-Vsig) \tag{5}$$

The source voltage of the transistor TR2 remains unchanged throughout the above described operation.

Figure 18:
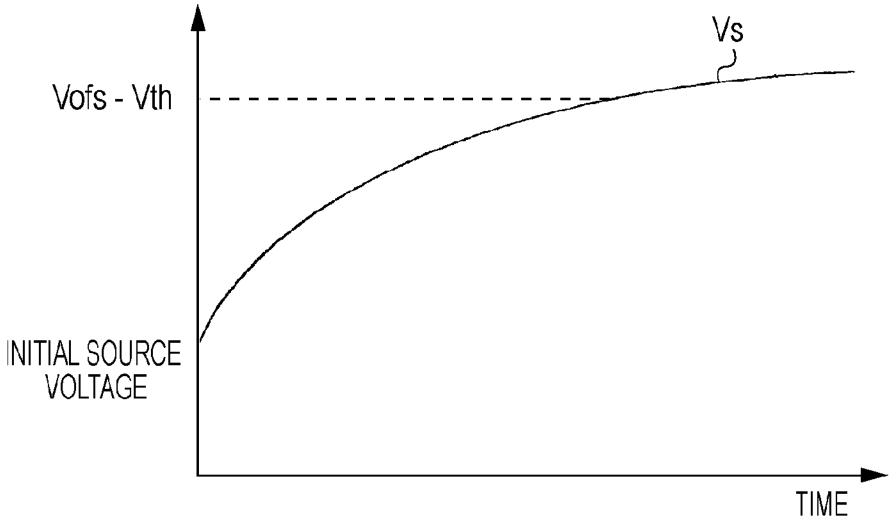
FIG. 18 illustrates a characteristic curve related to correction of a threshold voltage.

The state that the drive pulse signal DS is at the first signal level, as shown in FIG. 16, and the state that the drive pulse signal DS is at the third signal level, as shown in FIG. 17, are repeated by predetermined times in the pixel 33. The source voltage Vs of the transistor TR2 gradually rises to set the voltage difference between the two terminals of the signal level maintaining capacitor C1 to the threshold voltage Vth of the transistor TR2. As shown in FIG. 12, during periods TA, TB, and TC, the voltage difference between the two terminals of the signal level maintaining capacitor C1 is set to the threshold voltage Vth of the transistor TR2. FIG. 18 illustrates a characteristic curve that shows a change in the source voltage Vs of the transistor TR2 with the signal level of the signal line SIG maintained at the fixed voltage Vofs and the drive pulse signal DS at the first signal level for a long period of time. Finally, the gate-source voltage Vgs of the transistor TR2 becomes the voltage Vth. In this way, the display device 41 repeats the states of FIGS. 16 and 17 by a sufficient number of times to set the voltage difference between the two terminals of the signal level maintaining capacitor C1 to the threshold voltage Vth of the transistor TR2.

Figure 19:
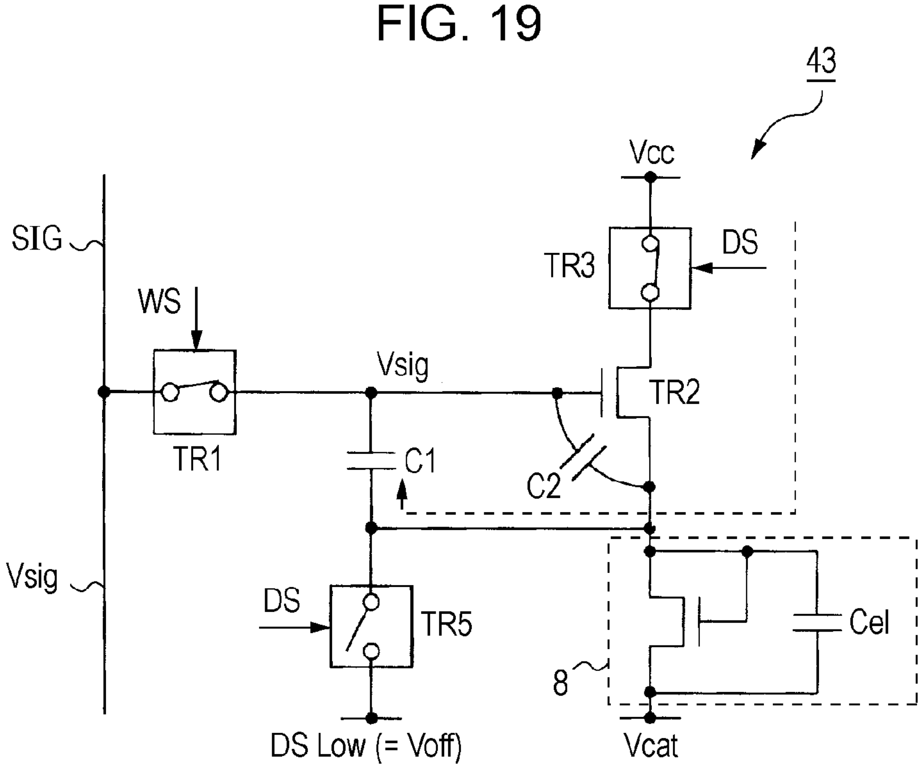
FIG. 19 is a schematic diagram illustrating a setting of the pixel during a period T24 of FIG. 12.

Within a period T23, the threshold voltage Vth of the transistor TR2 is set at the signal level maintaining capacitor C1 in the pixel 33. The drive pulse signal DS is transitioned to the third signal level at the timing the signal level of the signal line SIG rises to the signal level Vsig of the corresponding pixel immediately prior to the start of the period T21. As shown in FIG. 19, the voltage at the one terminal of the signal level maintaining capacitor C1 is set to the signal level of the signal line SIG. The drive pulse signal DS is transitioned from the third signal level to the first signal level with the signal level of the signal line SIG set to the signal level of the corresponding pixel. The signal level of the signal line SIG is sample-held to the signal level maintaining capacitor C1.

Figure 20:
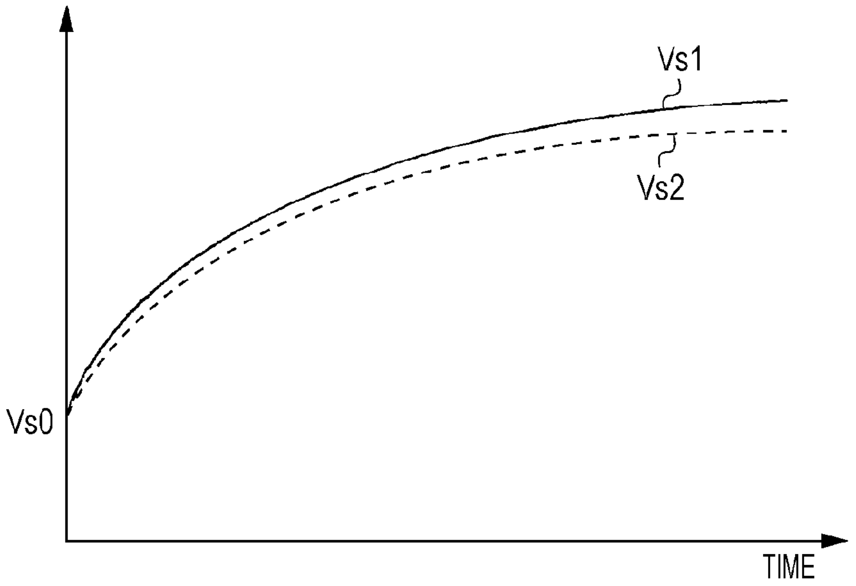
FIG. 20 illustrates a characteristic curve related to correction of a mobility.

The write signal WS is transitioned to the lower voltage level thereof in the pixel 43. As shown in FIG. 13, the transistor TR1 is turned off, and the emission period T21 starts. With the drive pulse signal DS transitioned from the third signal level to the first signal level, the source voltage Vs of the transistor TR2 changes depending on the mobility of the transistor TR2 within the period T24 until the falling of the write signal WS, as shown in FIG. 20. Variations in the mobility of the transistor TR2 are thus corrected.

In accordance with the second embodiment as well as the first embodiment, the signal level of the signal line SIG is set to the signal level corresponding to the gradation of each pixel except the durations of the fixed voltage Vofs. Along with the setting of the signal line SIG, the drive pulse signal DS is switched between the first signal level and the third signal level. Variations in the emission luminance due to variations in the threshold voltage Vth of the transistor TR2 are prevented. The number of scanning lines is even more reduced. The number of transistors forming the pixel circuit is also reduced. By switching repeatedly the signal level of the drive pulse signal DS by several times, the threshold voltage Vth of the transistor TR2 is set to the signal level maintaining capacitor C1 with a sufficient time permitted. Variations in the emission luminance due to variations in the threshold voltage Vth of the transistor TR2 are reliably prevented.

The second signal level of the drive pulse signal DS is set to the fixed voltage Vss for maintaining the source voltage Vs of the transistor TR2 to the second signal level. The third signal level of the drive pulse signal DS is set to be higher than the difference voltage between the gate voltage of the transistor TR2 and the threshold voltage Vth of the transistor TR2. The transistors TR3 and TR5 are selectively or concurrently turned off. Variations in the emission luminance due to variations in characteristics of the transistors are controlled.

The fixed voltage Vini of the transistor TR5 is set to be higher than the sum of the second signal level and the threshold voltage VthT5 of the transistor TR5 and lower than the sum of the gate voltage for turning off the transistor TR3 and the threshold voltage VthT5 of the transistor TR5. The transistors TR3 and TR5 are thus reliably controlled by the single control signal.

The transistor TR1 is turned off in response to the write signal immediately prior to the start of the emission period but subsequent to the setting of the drive pulse signal DS to the first signal level. Variations in the emission luminance due to variations in the mobility of the transistor TR2 are thus controlled.

By fabricating the pixel circuit and the driver circuit of all N-channel transistors on an insulation substrate, the display device is manufactured in a simple manufacturing process.

In the above-referenced embodiments, the organic EL element as a light emitting element is current driven. The present invention is not limited to the organic EL element. The present invention is widely applicable to display devices employing a variety of current-driven light emitting elements.

Figure 35:
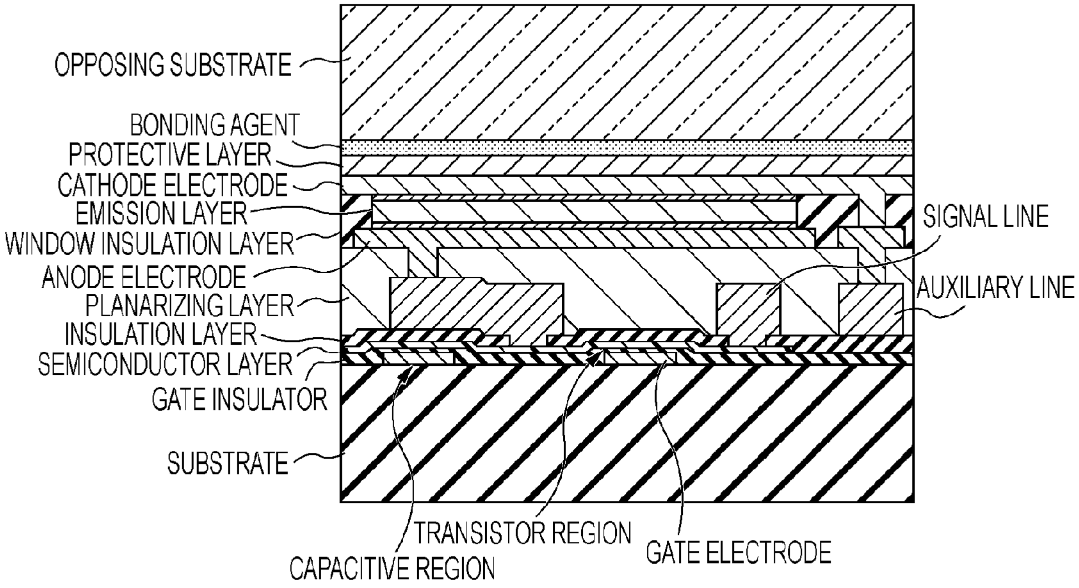
FIG. 35 is a cross-sectional view illustrating a device structure of a display device in accordance with one embodiment of the present invention.

A display device of one embodiment of the present invention has a thin-film device structure, as shown in FIG. 35. FIG. 35 is a cross-sectional view diagrammatically illustrating a pixel formed on an insulation substrate. As shown, the pixel includes a transistor region containing a plurality of thin-film transistors (TFTs) (one TFT shown in FIG. 35), a capacitive region such as a storage capacitor, and a light emission region such as an organic EL element. The transistor region and the capacitive region are formed on a substrate using a TFT process. The light emission region, such as the organic EL element, is laminated on top of the transistor region and the capacitive region. An opposing substrate is then bonded on the light emission region with a bonding agent interposed therebetween to manufacture a flat panel.

Figure 36:
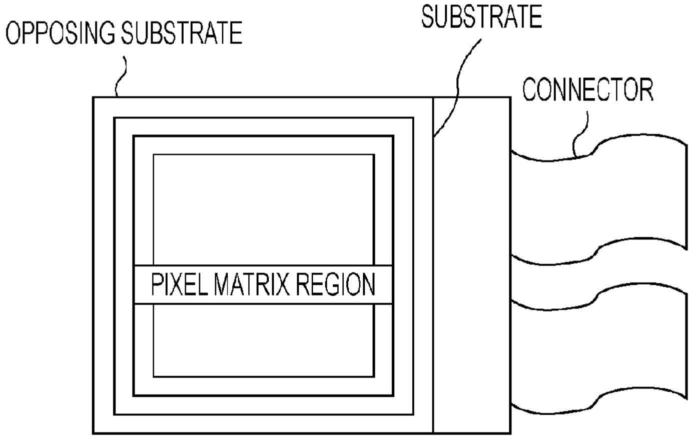
FIG. 36 is a plan view illustrating a module structure of the display device in accordance with one embodiment of the present invention.

A display device of one embodiment of the present invention is a flat-module type, as shown in FIG. 36. The display device includes a pixel array section fabricated of a matrix of pixels, each pixel including an organic EL element, a thin-film transistor, and a thin-film capacitor. A bonding agent is applied to surround the pixel array section, and a glass substrate as an opposing substrate is bonded onto the bonding agent to form a display module. A color filter, a protective layer, a light-blocking layer, etc. may be arranged on the transparent opposing substrate as necessary. A flexible printed circuit (FPC) may also be arranged as a connector for exchanging signals with the outside.

The display devices discussed above have a flat-panel structure and are applicable as a display of a variety of electronic apparatuses. The display device displays a video signal input to the electronic apparatus or a video signal generated in the electronic apparatus. Such electronic apparatuses include a digital camera, a notebook computer, a cellular phone and a video camera.

Figure 37:
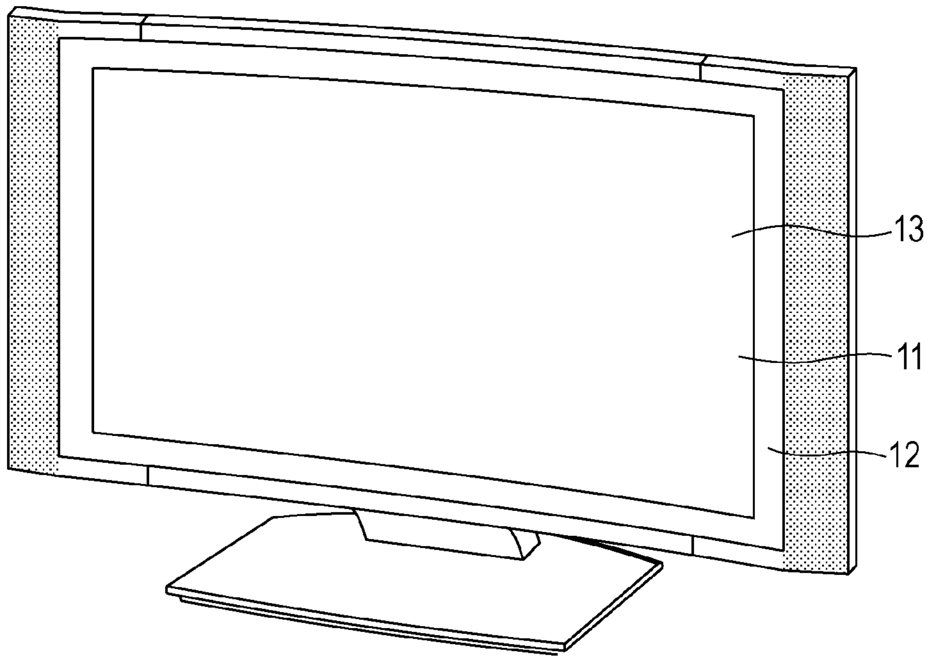
FIG. 37 is a perspective view of a television set containing the display device of one embodiment of the present invention.

A television receiver in accordance with one embodiment of the present invention of FIG. 37 includes a video display screen 11 including a front panel 12 and a filter glass 13. The display device of one embodiment of the present invention may be used for the video display screen 11.

Figure 38:
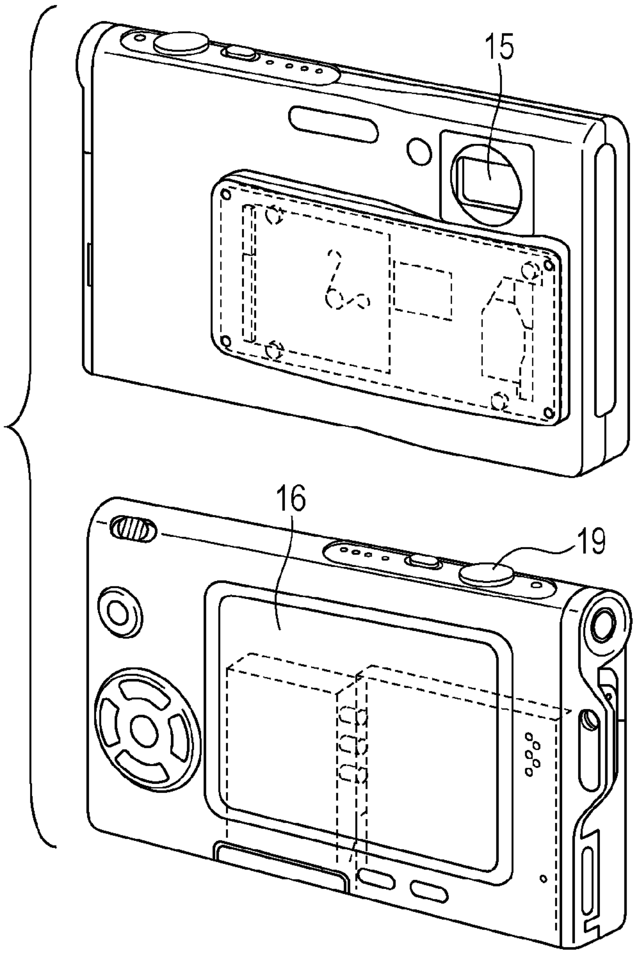
FIG. 38 is a perspective view of a digital still camera containing the display device of one embodiment of the present invention.

FIG. 38 shows a digital camera in accordance with one embodiment of the present invention. An upper portion of FIG. 38 is a front view of the digital camera and the lower portion of FIG. 38 is a rear view of the digital camera. The digital camera includes an imaging lens, a flash 15, a display 16, a control switch, a menu switch, a shutter 19, etc. The display device of one embodiment of the present invention may be used for the display 16.

Figure 39:
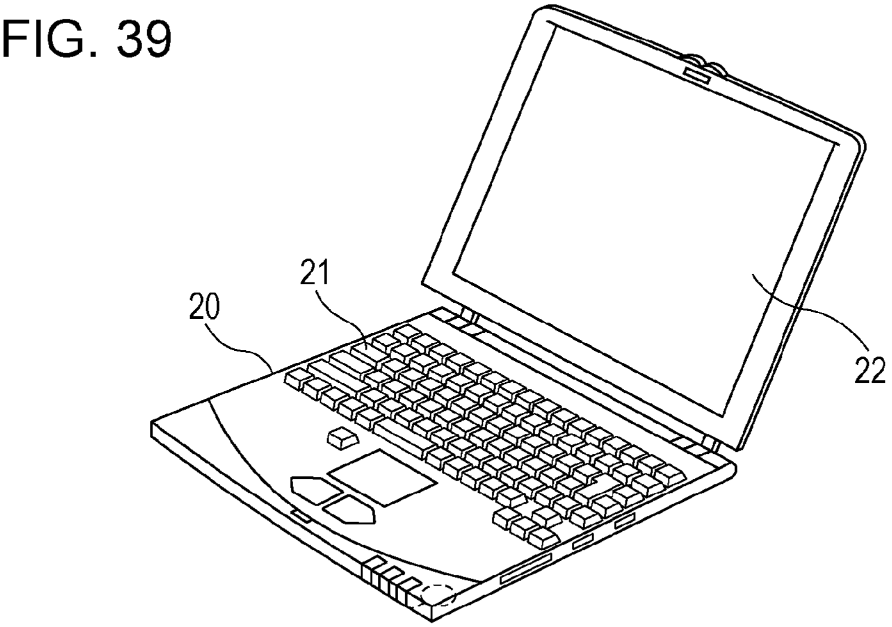
FIG. 39 is a perspective view of a notebook personal computer containing the display device of one embodiment of the present invention.

A notebook personal computer of FIG. 39 includes a keyboard 31 to be operated to input text or the like onto a main unit 20, and a display 22 on the cover of the main unit for displaying an image. The display device of one embodiment of the present invention may be used for the display 22.

Figure 34:
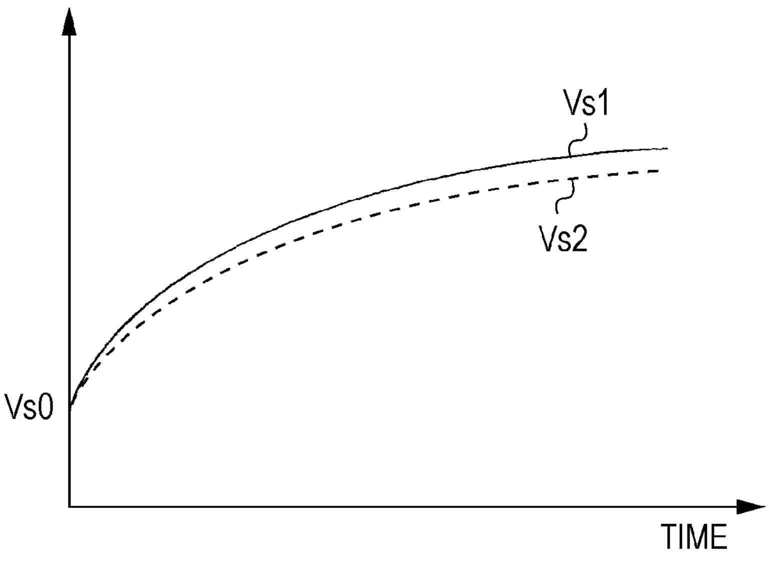
FIG. 34 illustrates a characteristic curve related to correction of a mobility.
Figure 40:
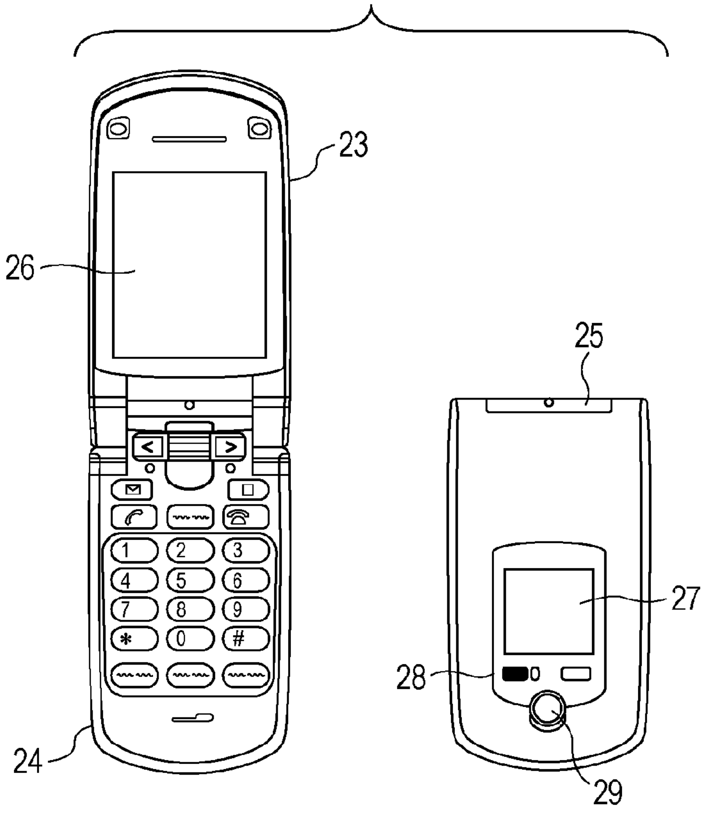
FIG. 40 diagrammatically illustrates a cellular phone containing the display device of one embodiment of the present invention.

FIG. 40 illustrates a cellular phone. The left portion of FIG. 40 illustrates the cellular phone in the open state thereof and the right portion of FIG. 34 illustrates the cellular phone in the closed state thereof. The cellular phone includes a top side casing 23, a bottom side casing 24, an hinge portion 25, a display 26, a sub-display 27, a picture light 28, a camera 29, etc. The display device of one embodiment of the present invention may be used for one of the display 26 and the sub display 27.

Figure 41:
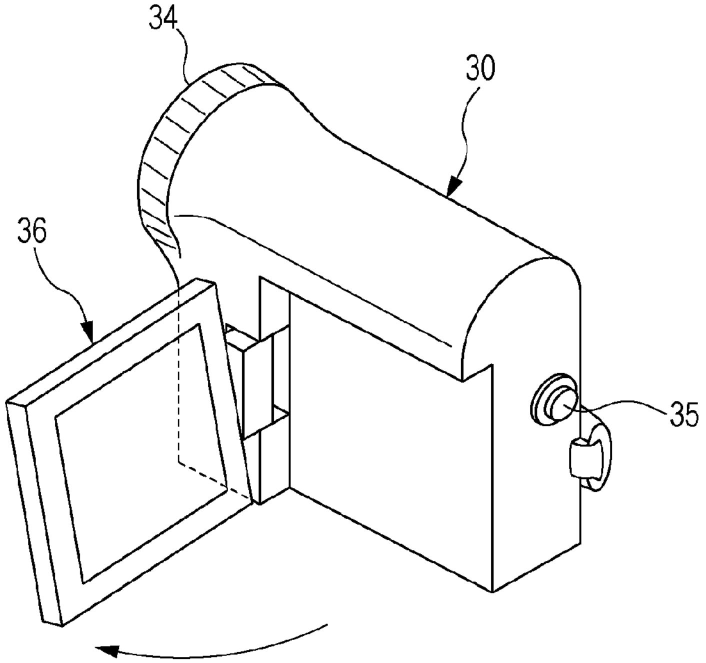
FIG. 41 diagrammatically illustrates a video camera containing the display device of one embodiment of the present invention.

A video camera of FIG. 41 includes a main unit 30, an imaging lens 34 facing frontward in the open state thereof, a start/stop switch 35 for photographing, a monitor 36, etc. The display device of one embodiment of the present invention may be used for the monitor 36.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising a plurality of pixel units and a driver circuit configured to drive the pixel unit, the pixel unit including:

a capacitor;

a light emitting element; and a transistor connected between a terminal of the capacitor and a signal line, wherein the driver circuit is configured to output a drive pulse signal to the signal line, and the gate of the transistor is connected to a fixed voltage.

2. The display device according to claim 1, wherein the light emitting element has an anode electrode, a light emitting layer, and a cathode electrode, and the light emitting element is provided on a planarization layer covering the transistor.

3. The display device according to claim 2, wherein the cathode electrode is provided on a window insulation layer which is arranged on the planarization layer, and the cathode electrode is connected to a wiring via a first contact formed in the planarization layer and a second contact formed in the window insulation layer.

4. The display device according to claim 1, wherein the pixel unit includes a transistor region containing the transistor, a capacitive region containing the capacitor, and a light emission region containing the light emitting element.

5. The display device according to claim 4, wherein the transistor region and the capacitive region are formed on a substrate, and the light emission region is disposed on the transistor region and the capacitive region.

6. The display device according to claim 5, further comprising an opposing substrate bonded on the light emission region.

7. The display device according to claim 6, wherein
an adhesive member is applied to surround a pixel array, and
the opposing substrate is bonded onto the adhesive member to form substrate.

8. The display device according to claim 7, further comprising a color filter arranged on the opposing substrate.

9. The display device according to claim 7, further comprising a connector for exchanging signals with the outside.

10. An electronic apparatus comprising the display device of claim 9.

11. A display device comprising a plurality of pixel units and a driver circuit configured to drive the pixel unit,
the pixel unit including:
a capacitor;
a light emitting element; and
a transistor connected between an anode of the light emitting element and a signal line,
wherein the driver circuit is configured to output a drive pulse signal to the signal line, and the gate of the transistor is connected to a fixed voltage.

12. The display device according to claim 11, wherein
the light emitting element has an anode electrode, a light emitting layer, and a cathode electrode, and
the light emitting element is provided on a planarization layer covering the transistor.

13. The display device according to claim 12, wherein
the cathode electrode is provided on a window insulation layer which is arranged on the planarization layer, and
the cathode electrode is connected to a wiring via a first contact formed in the planarization layer and a second contact formed in the window insulation layer.

14. The display device according to claim 11, wherein
the pixel unit includes a transistor region containing the transistor, a capacitive region containing the capacitor, and a light emission region containing the light emitting element.

15. The display device according to claim 14, wherein
the transistor region and the capacitive region are formed on a substrate, and
the light emission region is disposed on the transistor region and the capacitive region.

16. The display device according to claim 15, further comprising an opposing substrate bonded on the light emission region.

17. The display device according to claim 16, wherein
an adhesive member is applied to surround a pixel array, and
the opposing substrate is bonded onto the adhesive member to form substrate.

18. The display device according to claim 17, further comprising a color filter arranged on the opposing substrate.

19. The display device according to claim 17, further comprising a connector for exchanging signals with the outside.

20. An electronic apparatus comprising the display device of claim 19.

* * * * *